United States Patent
Kar et al.

(10) Patent No.: US 11,299,684 B2
(45) Date of Patent: *Apr. 12, 2022

(54) HIGH NAPHTHENIC CONTENT MARINE FUEL COMPOSITIONS

(71) Applicant: ExxonMobil Research and Engineering Company, Annandale, NJ (US)

(72) Inventors: Kenneth C. H. Kar, Yardley, PA (US); Sheryl B. Rubin-Pitel, Newtown, PA (US); Lisa M. Guay, Morristown, NJ (US); Timothy J. Anderson, Chatham, NJ (US); Shifang Luo, Annandale, NJ (US); Marcia E. Dierolf, Oley, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/126,204

(22) Filed: Dec. 18, 2020

(65) Prior Publication Data

US 2021/0363447 A1    Nov. 25, 2021

Related U.S. Application Data

(63) Continuation of application No. 16/881,293, filed on May 22, 2020, now Pat. No. 10,899,983.

(Continued)

(51) Int. Cl.
*C10L 1/08* (2006.01)
*C10G 31/06* (2006.01)
*C10L 1/04* (2006.01)

(52) U.S. Cl.
CPC .............. *C10L 1/08* (2013.01); *C10G 31/06* (2013.01); *C10L 1/04* (2013.01);
(Continued)

(58) Field of Classification Search
CPC ...... C10G 2300/107; C10G 2300/1077; C10G 2300/201; C10G 2300/202;
(Continued)

(56) References Cited

U.S. PATENT DOCUMENTS

| | | | |
|---|---|---|---|
| 8,987,537 B1 * | 3/2015 | Droubi | .................... C10L 10/02 208/15 |
| 8,999,011 B2 | 4/2015 | Stern et al. | |

(Continued)

OTHER PUBLICATIONS

Bryden et al., "Catalytic Solutions for Processing Shale Oils in the FCC", pp. 1-6, article 1000919, PTQ Q2, www.digitalrefining.com, Apr. 2014.

(Continued)

*Primary Examiner* — Latosha Hines
(74) *Attorney, Agent, or Firm* — Robert A. Migliorini

(57) ABSTRACT

Marine diesel fuel/fuel blending component compositions and fuel oil/fuel blending component compositions are provided that are derived from crude oils having high naphthenes to aromatics volume and/or weight ratios and a low sulfur content. In addition to having a high naphthenes to aromatics ratio, a low sulfur content, and a low but substantial content of aromatics, such fuels and/or fuel blending components can have a reduced or minimized carbon intensity relative to fuels derived from conventional sources. The unexpected ratio of naphthenes to aromatics contributes to the fuels and/or fuel blending components further having additional unexpected properties, including low density, low kinematic viscosity, and/or high energy density.

27 Claims, 15 Drawing Sheets

Related U.S. Application Data

(60) Provisional application No. 63/028,688, filed on May 22, 2020.

(52) U.S. Cl.
CPC .............. *C10G 2300/107* (2013.01); *C10G 2300/1077* (2013.01); *C10G 2300/201* (2013.01); *C10G 2300/202* (2013.01); *C10G 2300/301* (2013.01); *C10G 2300/302* (2013.01); *C10G 2300/304* (2013.01); *C10G 2300/308* (2013.01); *C10L 2200/0415* (2013.01); *C10L 2200/0446* (2013.01); *C10L 2270/026* (2013.01); *C10L 2290/543* (2013.01)

(58) Field of Classification Search
CPC ........ C10G 2300/301; C10G 2300/302; C10G 2300/304; C10G 2300/308; C10G 31/06; C10G 7/00; C10L 1/026; C10L 1/08; C10L 2200/0446; C10L 2270/026; Y02E 50/10
See application file for complete search history.

(56) References Cited

U.S. PATENT DOCUMENTS

| | | |
|---|---|---|
| 10,316,263 B2 | 6/2019 | Rubin-Pitel et al. |
| 2009/0013590 A1 | 1/2009 | Lamprecht et al. |
| 2012/0246999 A1* | 10/2012 | Stern ................. C10L 1/1616 44/300 |
| 2016/0160139 A1* | 6/2016 | Robinson ............ C10G 45/08 208/15 |
| 2016/0298048 A1* | 10/2016 | Brown ............... C10G 67/0454 |
| 2017/0002279 A1* | 1/2017 | Brown ................... C10L 1/04 |
| 2017/0044445 A1 | 2/2017 | Kar et al. |
| 2017/0044451 A1* | 2/2017 | Kar ...................... C10L 1/14 |
| 2017/0183575 A1* | 6/2017 | Rubin-Pitel ......... C10G 21/14 |
| 2018/0371343 A1 | 12/2018 | Rubin-Pitel et al. |
| 2019/0093037 A1* | 3/2019 | Berkhous ............. C10L 3/10 |
| 2019/0185772 A1* | 6/2019 | Berkhous ............. C10L 1/08 |

OTHER PUBLICATIONS

International Search Report and Written Opinion PCT/US2021/033576 dated Sep. 6, 2021.

* cited by examiner

| | RME 180 VLSFO Limit | Conv. VLSFO | Shale Fuel Oil (1) | Shale Fuel Oil (2) | Shale Fuel Oil (3) | Shale Fuel Oil (4) | Shale Fuel Oil (5) | Conv. light sweet crude |
|---|---|---|---|---|---|---|---|---|
| n-paraffins (vol%) | | varies | 5.60 | 9.67 | 4.89 | 3.95 | 5.72 | 4.03 |
| i-paraffins (vol%) | | varies | 33.05 | 28.24 | 18.12 | 21.32 | 21.96 | 11.91 |
| naphthenes (vol%) | | varies | 47.73 | 46.47 | 35.17 | 50.09 | 47.45 | 37.27 |
| 1-ring aromatic ring class (vol%) | | varies | 7.49 | 8.49 | 15.17 | 11.27 | 11.20 | 13.89 |
| Aromatics (vol%) | | varies | 13.62 | 15.49 | 41.62 | 24.58 | 24.70 | 46.78 |
| | | | | | | | | |
| Density at 15°C (kg/m3) | Max 991.0 | 936.6 | 867.2 | 869.4 | 908.5 | 889.4 | 888.0 | 924.2 |
| KV50 (cSt) | Max 180.0 | ~110 | 50.89 | 47.91 | 140.81 | 102.56 | 77.69 | 190 |
| Aliphatic sulfur(wt%) | | | 0.010 | 0.011 | 0.075 | 0.044 | 0.037 | 0.223 |
| Sulfur(wt%) | Max 0.50 | 0.449 | 0.014 | 0.017 | 0.217 | 0.057 | 0.049 | 0.97 |
| Flash Point | Min 60 | >60 | 229 | 228 | 236 | 233 | 231 | 238 |
| CCAI | Max 860 | 818 | 753 | 756 | 781 | 765 | 768 | 793 |
| Energy content (MJ/kg) | | 41.72 | 42.78 | 42.75 | 42.20 | 42.49 | 42.51 | 41.75 |
| Carbon Intensity (kg of CO2/kg of fuel) | | 3.19 | 3.152 | 3.154 | 3.172 | 3.166 | 3.166 | 3.158 |
| Carbon(wt%) | | ~87 | 85.98 | 86.03 | 86.52 | 86.33 | 86.36 | 86.12 |
| Hydrogen (wt%) | | ~11.9 | 14.00 | 13.93 | 13.08 | 13.55 | 13.55 | 12.85 |
| Basic nitrogen (ppm m/m) | | | 25 | 30 | 596 | 200 | 147 | 640 |
| Nitrogen (ppm m/m) | | varies | 71 | 101 | 1881 | 545 | 495 | 2079 |
| Ratio of hydrogen to carbon | | 1.63 | 1.94 | 1.93 | 1.80 | 1.87 | 1.87 | 1.78 |
| BMCI | | varies | 22.2 | 23.6 | 39.8 | 31.8 | 31.8 | 46.9 |
| N-Heptane Insolubles (wt%) | | ~2 | 0.05 | 0.05 | 0.07 | 0.01 | 0.02 | 0.28 |
| MCR (wt%) | Max 15.00 | ~4 | 0.06 | 0.15 | 2.45 | 0.56 | 0.80 | 4.32 |

FIG. 3

|  | RMA 10 VLSFO Limit | Conv VLSFO | Simple Fuel Oil (1) | Simple Fuel Oil (2) | Simple Fuel Oil (3) | Simple Fuel Oil (4) | Simple Fuel Oil (5) | Conv light sweet crude |
|---|---|---|---|---|---|---|---|---|
| n-paraffins (vol%) |  | varies | 16.77 | 19.69 | 12.73 | 13.65 | 15.41 | 12.07 |
| i-paraffins (vol%) |  | varies | 30.58 | 27.95 | 21.09 | 22.85 | 22.80 | 16.77 |
| naphthenes (vol%) |  | varies | 44.72 | 43.18 | 41.04 | 48.96 | 47.27 | 41.61 |
| 1-ring aromatic ring class (vol%) |  | varies | 5.36 | 6.28 | 12.16 | 8.51 | 8.36 | 12.50 |
| Aromatics (vol%) |  | varies | 7.93 | 9.10 | 25.01 | 14.43 | 14.39 | 29.55 |
|  |  |  |  |  |  |  |  |  |
| Density at 15°C (kg/m3) | Max 920.0 | 936.6 | 824.3 | 825.1 | 857.0 | 842.6 | 841.3 | 867.4 |
| KV50 (cSt) | Max 10.00 | ~110 | 3.62 | 3.53 | 6.07 | 4.68 | 4.41 | 7.9 |
| Aliphatic Sulfur (wt%) |  |  | 0.004 | 0.005 | 0.037 | 0.022 | 0.016 | 0.169 |
| Sulfur(wt%) | Max 0.50 | 0.449 | 0.008 | 0.009 | 0.114 | 0.028 | 0.023 | 0.5960 |
| Flash Point | Min 60 | >60 | 63 | 61 | 65 | 63 | 63 | 66 |
| CCAI | Max 850 | 818 | 770 | 771 | 787 | 780 | 780 | 790 |
| Energy content (MJ/kg) |  | 41.72 | 43.28 | 43.28 | 42.87 | 43.07 | 43.08 | 42.58 |
| Carbon Intensity (kg of CO2/ kg of fuel) |  | 3.19 | 3.14 | 3.14 | 3.16 | 3.15 | 3.15 | 3.15 |
| Carbon(wt%) |  | ~87 | 85.69 | 85.74 | 86.26 | 86.02 | 86.03 | 86.05 |
| Hydrogen (wt%) |  | ~11.9 | 14.30 | 14.24 | 13.54 | 13.93 | 13.93 | 13.33 |
| Basic nitrogen (ppm m/m) |  |  | 8.4 | 10 | 259 | 73 | 54 | ~300 |
| Nitrogen (ppm m/m) |  | varies | 23 | 32 | 808 | 210 | 184 | 964 |
| Ratio of hydrogen to carbon |  | 1.63 | 1.99 | 1.98 | 1.87 | 1.93 | 1.93 | 1.85 |
| BMCI |  | varies | 22.0 | 22.7 | 32.7 | 29.0 | 28.1 | 36.0 |
| N-Heptane Insolubles (wt%) |  | ~2 | 0.016 | 0.015 | 0.012 | 0.027 | 0.003 | 0.123 |
| MCR (wt%) | Max 2.50 | ~4 | 0.019 | 0.045 | 0.070 | 1.008 | 0.196 | 1.92 |

FIG. 4

| | Method | Distillate 1 | Distillate 2 | Distillate 3 | Distillate 4 | Distillate 5 |
|---|---|---|---|---|---|---|
| API Gravity | D4052 | 34.8 | 35.9 | 38.3 | 35.8 | 38.3 |
| Specific Gravity (g/ml) | Calc. from API Gravity | 0.85 | 0.85 | 0.83 | 0.85 | 0.83 |
| Sulfur (wt%) | D2622 | 0.094 | 0.023 | 0.007 | 0.023 | 0.0075 |
| Nitrogen (wppm) | D4629 | 145 | 73 | <5 | 58 | 6.5 |
| Cloud Pt (°C) | D5773 | -1 | -4 | -3 | 0 | -1 |
| Pour Pt (°C) | D5949 | -1 | -4 | -2 | 1 | 0 |
| Derived Cetane Number | D7668* D6890 | 62, 59 | 62, 61 | 66, 64 | 64, 62 | 68, >64 |
| 10% off | D2887 | 296 | 295 | 293 | 300 | 300 |
| 50% off | D2887 | 323 | 322 | 320 | 326 | 326 |
| 90% off | D2887 | 354 | 353 | 353 | 356 | 356 |

| | Method | Distillate 6 | Distillate 7 |
|---|---|---|---|
| API Gravity | D4052 | 36.6 | 33.6 |
| Specific Gravity (g/ml) | Calc. from API Gravity | 0.84 | 0.86 |
| Sulfur (wt%) | D2622 | - | - |
| Nitrogen (wppm) | D4629 | 48 | 82 |
| Cloud Pt (°C) | D5773 | 1 | 4 |
| Pour Pt (°C) | D5949 | -1 | 3 |
| Derived Cetane Number | D7668* D6890 | 70.57* | 64.00* |
| 10% off | D2887 | 293 | 298 |
| 50% off | D2887 | 327 | 328 |
| 90% off | D2887 | 361 | 361 |

FIG. 5

|  | Units | Distillate 8 | Distillate 9 | Distillate 10 | Distillate 11 | Distillate 12 | ISO 8217 DMA Limit |
|---|---|---|---|---|---|---|---|
| Flash Point | °C | 63 | 62 | 64 | 63 | 63 | Min. 60 |
| Density at 15°C | kg/m³ | 813.4 | 814.1 | 832.7 | 826.5 | 826.6 | Max. 890.0 |
| Viscosity at 40°C | cSt | 2.6 | 2.5 | 2.8 | 2.7 | 2.7 | 2 - 6 |
| Viscosity at 50°C | cSt | 2.2 | 2.2 | 2.4 | 2.3 | 2.3 | - |
| Sulfur Content | mass% | 0.00543 | 0.00563 | 0.05926 | 0.01716 | 0.01366 | Max 1.00 / By Regulation Max: 0.1, 0.05, 0.001-0.0015 |
| Carbon Content | mass% | 85.61 | 85.65 | 86.15 | 85.92 | 85.93 | - |
| Hydrogen Content | mass% | 14.38 | 14.34 | 13.77 | 14.05 | 14.06 | - |
| Nitrogen Content | mg/kg | 6 | 4 | 128 | 53 | 42 | - |
| Energy Content | MJ/kg | 43.2 | 43.2 | 42.9 | 43.0 | 43.0 | - |
| Cloud Point | °C | 8 | -2 | 2 | 5 | 0 | - |
| Pour Point | °C | 3 | -6 | -3 | 0 | -5 | Summer 0 Winter -6 (Max) |
| Cetane Index, 4-number | - | 55 | 54 | 50 | 50 | 51 | Min. 40 |
| Cetane Index, 2-number | - | 57 | 56 | 52 | 52 | 53 | - |
| Acid Number | mgKOH/g | 0.04 | 0.02 | 0.06 | 0.04 | 0.05 | Max. 0.5 |
| Atmospheric Distillation (D86) | | | | | | | |
| 10% off Temp. | °F | 374 | 371 | 377 | 373 | 375 | - |
| 50% off Temp. | °F | 487 | 483 | 502 | 485 | 495 | - |
| 90% off Temp. | °F | 697 | 700 | 713 | 705 | 707 | - |
| n-paraffins | vol% | 20 | 22 | 17 | 17 | 19 | - |
| i-paraffins | vol% | 31 | 29 | 24 | 25 | 24 | - |
| cyclo-paraffins | vol% | 43 | 42 | 43 | 47 | 46 | - |
| 1-ring | vol% | 32 | 29 | 30 | 32 | 32 | - |
| Aromatics | vol% | 6 | 7 | 16 | 11 | 10 | - |
| Saturates | vol% | 94 | 93 | 84 | 89 | 89 | - |

FIG. 6

|  |  | Comparative Example Distillate 1 | Comparative Example Distillate 2 | Comparative Example Distillate 3 | ISO 8217 DMA Limits |
|---|---|---|---|---|---|
| Flash Point | °C | 87 | 65 | 93 | Min. 60 |
| Density at 15°C | kg/m³ | 909.6 | 838.1 | 887.8 | Max. 890 |
| Viscosity at 40°C | cSt | 8.3 | 3.4 | 7.0 | 2 - 6 |
| Viscosity at 50°C | cSt | 6.2 | 2.8 | 5.3 | - |
| Sulfur Content | mass% | 2.2536 | 0.3653 | 0.3258 | Max 1.00 / By Regulation Max: 0.1, 0.05, 0.001-0.0015 |
| Carbon Content | mass% | 85.57 | 86.03 | 87.03 | - |
| Hydrogen Content | mass% | 12.17 | 13.61 | 12.58 | - |
| Nitrogen Content | mg/kg | 421 | 184 | 193 | - |
| Energy Content | MJ/kg | 41.3 | 42.8 | 42.2 | - |
| Cloud Point | °C | -31 | 5 | 9 | - |
| Pour Point | °C | -35 | 1 | 5 | Summer 0 Winter -6 (Max) |
| Cetane Index, 4-number | - | 34 | 49 | 42 | Min. 40 |
| Cetane Index, 2-number | - | 39 | 51 | 44 |  |
| Acid Number | mgKOH/g | 0.69 | 0.05 | 0.98 | Max. 0.5 |
| Atmospheric Distillation (D86) |  |  |  |  |  |
| 10% off Temp. | °F | 448 | 377 | 470 | - |
| 50% off Temp. | °F | 609 | 510 | 605 | - |
| 90% off Temp. | °F | 736 | 716 | 734 | - |
| Composition |  |  |  |  |  |
| n-paraffins | vol% | 1 | 17 | 5 | - |
| i-paraffins | vol% | 10 | 21 | 15 | - |
| cyclo-paraffins | vol% | 45 | 43 | 44 | - |
| 1-ring | vol% | 20 | 28 | 24 | - |
| Aromatics | vol% | 41 | 19 | 36 | - |
| Saturates | vol% | 56 | 81 | 64 | - |

FIG. 7

| | Units | Distillate 13 | Distillate 14 | Distillate 15 | Distillate 16 | Distillate 17 | ISO 8217 DMA Limit |
|---|---|---|---|---|---|---|---|
| Flash Point | °C | 64 | 62 | 65 | 63 | 64 | Min. 60 |
| Density at 15°C | kg/m$^3$ | 816.1 | 816.9 | 836.9 | 829.8 | 829.8 | Max. 890.0 |
| Viscosity at 40°C | cSt | 2.8 | 2.8 | 3.2 | 3.0 | 3.1 | 2 - 6 |
| Viscosity at 50°C | cSt | 2.4 | 2.4 | 2.7 | 2.5 | 2.6 | - |
| Sulfur Content | mass % | 0.00558 | 0.00591 | 0.06660 | 0.01946 | 0.01511 | Max 1.00 / 0.1, 0.05, 0.001-0.0015 |
| Carbon Content | mass % | 85.63 | 85.68 | 86.19 | 85.95 | 85.95 | - |
| Hydrogen Content | mass % | 14.36 | 14.32 | 13.72 | 14.02 | 14.02 | - |
| Nitrogen Content | mg/kg | 8 | 7 | 173 | 66 | 54 | - |
| Energy Content | MJ/kg | 43.1 | 43.1 | 42.9 | 43.0 | 43.0 | - |
| Cloud Point | °C | 14 | 5 | 9 | 11 | 6 | - |
| Pour Point | °C | 9 | 0 | 4 | 7 | 2 | Summer 0 Winter -6 |
| Cetane Index, 4-number | - | 54 | 53 | 49 | 50 | 51 | Min. 40 |
| Cetane Index, 2-number | - | 57 | 57 | 52 | 52 | 54 | - |
| Acid Number | mgKOH/g | 0.04 | 0.03 | 0.07 | 0.04 | 0.06 | Max. 0.5 |
| Atmospheric Distillation (D86) | | | | | | | |
| 10% off | °F | 377 | 373 | 380 | 375 | 377 | - |
| 50% off | °F | 499 | 496 | 520 | 499 | 510 | - |
| 90% off | °F | 736 | 739 | 758 | 748 | 748 | - |
| n-paraffins | vol% | 19 | 21 | 16 | 17 | 18 | - |
| i-paraffins | vol% | 31 | 29 | 24 | 25 | 24 | - |
| cyclo-paraffins | vol% | 43 | 43 | 43 | 47 | 46 | - |
| 1-ring | vol% | 32 | 30 | 29 | 32 | 32 | - |
| Aromatics | vol% | 6 | 7 | 17 | 11 | 11 | - |
| Saturates | vol% | 93 | 93 | 83 | 89 | 88 | - |

FIG. 8

|  |  | Comparative Example Distillate 1 | Comparative Example Distillate 2 | Comparative Example Distillate 3 | ISO 8217 DMA Limits |
|---|---|---|---|---|---|
| Flash Point | °C | 87 | 65 | 93 | Min. 60 |
| Density at 15°C | kg/m³ | 909.6 | 838.1 | 887.8 | Max. 890 |
| Viscosity at 40°C | cSt | 8.3 | 3.4 | 7.0 | 2 - 6 |
| Viscosity at 50°C | cSt | 6.2 | 2.8 | 5.3 | - |
| Sulfur Content | mass% | 2.2536 | 0.3653 | 0.3258 | Max 1.00 / By Regulation Max: 0.1, 0.05, 0.001-0.0015 |
| Carbon Content | mass% | 85.57 | 86.03 | 87.03 | - |
| Hydrogen Content | mass% | 12.17 | 13.61 | 12.58 | - |
| Nitrogen Content | mg/kg | 421 | 184 | 193 | - |
| Energy Content | MJ/kg | 41.3 | 42.8 | 42.2 | - |
| Cloud Point | °C | -31 | 5 | 9 | - |
| Pour Point | °C | -35 | 1 | 5 | Summer 0 Winter -6 |
| Cetane Index, 4-number | - | 34 | 49 | 42 | Min. 40 |
| Cetane Index, 2-number | - | 39 | 51 | 44 |  |
| Acid Number | mgKOH/g | 0.69 | 0.05 | 0.98 | Max. 0.5 |
| Atmospheric Distillation (D86) |  |  |  |  |  |
| 10% off | °F | 448 | 377 | 470 | - |
| 50% off | °F | 609 | 510 | 605 | - |
| 90% off | °F | 736 | 716 | 734 | - |
| Composition |  |  |  |  |  |
| n-paraffins | vol% | 1 | 17 | 5 | - |
| i-paraffins | vol% | 10 | 21 | 15 | - |
| cyclo-paraffins | vol% | 45 | 43 | 44 | - |
| 1-ring | vol% | 20 | 28 | 24 | - |
| Aromatics | vol% | 41 | 19 | 36 | - |
| Saturates | vol% | 56 | 81 | 64 | - |

FIG. 9

|  | Method | Units | Distillate 1 | Distillate 2 | Distillate 3 | Distillate 4 | Distillate 5 |
|---|---|---|---|---|---|---|---|
| API Gravity | D4052 | - | 27.3 | 29.5 | 32.7 | 29.6 | 32.9 |
| Specific Gravity | Calc. from API Gravity | g/ml | 0.8911 | 0.8789 | 0.8618 | 0.8783 | 0.8607 |
| Density at 15°C | D7042 |  | 0.8866 | 0.8737 | 0.8558 | 0.8729 | 0.8547 |
| Viscosity at 60°C | D7042 | mm2/s | 21.932 | 18.841 | 13.900 | 18.556 | 14.84 |
| Viscosity at 100°C | D7042 | mm2/s | 6.9585 | 6.2963 | 5.2090 | 6.3081 | 5.4272 |
| VI | Calc from KV60 / KV100 | - | 91.0 | 97.341 | 117.9 | 103.5 | 113.6 |
| Sulfur Content | D2622 | mass% |  | 0.040 | 0.012 | 0.039 | 0.010 |
| Nitrogen Content | D4629 | mg/kg |  | 344 | 63 | 307 | 52 |
| Hydrogen Content | AMI1807 | mass% | 13.13 | 13.61 | 13.99 | 13.51 | 14.03 |
| Pour Point | D5949 | °C |  |  |  |  |  |
| MCR | D4530 | mass% | 0.09 | 0.03 | 0.01 | 0.08 | 0.02 |
| Saturates |  | mass% |  | 76.99 | 89.06 | 78.95 | 87.59 |
| ARC1 |  | mass% |  | 9.86 | 6.26 | 9.93 | 5.67 |
| ARC2 |  | mass% |  | 4.45 | 2.53 | 5.53 | 2.14 |
| ARC3 |  | mass% |  | 2.94 | 1.5 | 3.87 | 1.12 |
| ARC4 |  | mass% |  | 2.5 | 0 | 0 | 0 |
| Sulfides |  | mass% |  | 2.32 | 0.65 | 1.72 | 1.59 |
| Polars |  | mass% |  | 0.95 | 0 | 0 | 1.9 |
| 10% off | D2887 | °C | 708 | 701 | 696 | 713 | 708 |
| 50% off | D2887 | °C | 820 | 811 | 802 | 815 | 807 |
| 90% off | D2887 | °C | 954 | 949 | 944 | 946 | 940 |

FIG. 10

|  | Method | Units | Distillate 6 | Distillate 7 |
|---|---|---|---|---|
| API Gravity | D4052 | - | 30.1 | 27.2 |
| Specific Gravity | Calc. from API Gravity | g/ml | 0.8756 | 0.8916 |
| Density at 15°C | D7042 |  | 0.8705 | 0.8871 |
| Viscosity at 60°C | D7042 | mm2/s | 17.78 | 21.772 |
| Viscosity at 100°C | D7042 | mm2/s | 6.1592 | 7.0177 |
| VI | Calc from KV60 / KV100 | - | 91.437 | 97.502 |
| Sulfur Content | D2622 | mass% |  |  |
| Nitrogen Content | D4629 | mg/kg |  |  |
| Hydrogen Content | AMI1807 | mass% |  |  |
| Pour Point | D5949 | °C |  |  |
| MCR | D4530 | mass% |  |  |
| Saturates |  | mass% |  |  |
| ARC1 |  | mass% |  |  |
| ARC2 |  | mass% |  |  |
| ARC3 |  | mass% |  |  |
| ARC4 |  | mass% |  |  |
| Sulfides |  | mass% |  |  |
| Polars |  | mass% |  |  |
| 10% off | D2887 | °C | 717 | 712 |
| 50% off | D2887 | °C | 820 | 826 |
| 90% off | D2887 | °C | 958 | 963 |

FIG. 11

| Name | | VGO 1 | VGO 2 | VGO 3 | VGO 4 | VGO 5 | ISO 8217 RMD80 Limits |
|---|---|---|---|---|---|---|---|
| Flash Point | °C | 221 | 220 | 223 | 222 | 221 | Min. 60 |
| Density at 15°C | kg/m³ | 862.6 | 863.7 | 890.1 | 880.2 | 878.4 | Max. 975 |
| Viscosity at 50°C | cSt | 21.2 | 20.2 | 29.4 | 27.1 | 25.8 | Max. 80 |
| Sulfur Content | mass% | 0.009 | 0.011 | 0.167 | 0.052 | 0.038 | By Regulation Max: 0.1, 0.5 |
| Carbon Content | mass% | 85.97 | 86.02 | 86.52 | 86.36 | 86.35 | - |
| Hydrogen Content | mass% | 14.01 | 13.96 | 13.23 | 13.55 | 13.57 | - |
| Nitrogen Content | mg/kg | 51 | 59 | 832 | 308 | 277 | - |
| Ratio of hydrogen to carbon | - | 1.94 | 1.93 | 1.82 | 1.87 | 1.87 | - |
| Energy Content | MJ/kg | 42.84 | 42.82 | 42.45 | 42.61 | 42.64 | - |
| Cloud Point | °C | 44 | 37 | 39 | 42 | 36 | - |
| Pour Point | °C | 42 | 34 | 37 | 39 | 34 | Max. 30 |
| CCAI | - | 764 | 766 | 785 | 777 | 776 | Max. 860 |
| Acid Number | mgKOH/g | 0.08 | 0.07 | 0.11 | 0.08 | 0.11 | Max. 2.5 |
| MCR | mass% | 0.02 | 0.04 | 0.19 | 0.09 | 0.07 | Max. 15.00 |
| BMCI | - | 22.4 | 23.1 | 34.7 | 30.4 | 29.8 | |
| N-heptane insolubles | mass% | 0.00 | 0.00 | 0.00 | 0.00 | 0.00 | |
| 10% off | °F | 732 | 731 | 737 | 734 | 733 | - |
| 50% off | °F | 788 | 785 | 800 | 794 | 789 | - |
| 90% off | °F | 904 | 902 | 910 | 907 | 905 | - |
| n-paraffins | vol% | 6.39 | 8.39 | 6.31 | 5.32 | 7.28 | - |
| i-paraffins | vol% | 35.07 | 31.17 | 23.80 | 26.45 | 25.98 | - |
| cyclo-paraffins | vol% | 47.82 | 47.71 | 38.72 | 48.10 | 46.35 | - |
| 1-ring | vol% | 28.81 | 30.91 | 23.24 | 27.45 | 28.11 | - |
| Aromatics | vol% | 10.72 | 12.57 | 30.88 | 20.06 | 20.17 | - |

FIG. 12

| | | Comparative Example Distillate 1 | Comparative Example Distillate 2 | Comparative Example Distillate 3 | ISO 8217 RMD80 Limits |
|---|---|---|---|---|---|
| Flash Point | °C | 229 | 224 | 226 | Min. 60 |
| Density at 15°C | kg/m³ | 967.3 | 902.2 | 932.0 | Max. 975 |
| Viscosity at 50°C | cSt | 233 | 45 | 73 | Max. 80 |
| Sulfur Content | mass% | 3.467 | 0.703 | 0.688 | By Regulation Max: 0.1, 0.5 |
| Carbon Content | mass% | 84.75 | 86.19 | 86.84 | - |
| Hydrogen Content | mass% | 11.48 | 12.98 | 12.25 | - |
| Nitrogen Content | mg/kg | 1756 | 1099 | 1087 | - |
| Ratio of hydrogen to carbon | - | 1.61 | 1.79 | 1.68 | - |
| Energy Content | MJ/kg | 40.37 | 42.12 | 41.74 | - |
| Cloud Point | °C | -2 | 38 | 40 | - |
| Pour Point | °C | -4 | 36 | 38 | Max. 30 |
| CCAI | - | 833 | 790 | 813 | Max. 860 |
| Acid Number | mgKOH/g | 1.29 | 0.10 | 1.79 | Max. 2.5 |
| | | | | | |
| 10% off | °F | 748 | 739 | 742 | - |
| 50% off | °F | 824 | 804 | 811 | - |
| 90% off | °F | 917 | 910 | 914 | - |
| | | | | | |
| n-paraffins | vol% | 0.44 | 6.06 | 4.21 | - |
| i-paraffins | vol% | 6.45 | 17.27 | 13.84 | - |
| cyclo-paraffins | vol% | 27.54 | 42.81 | 34.42 | - |
| 1-ring | vol% | 8.71 | 23.67 | 18.22 | - |
| Aromatics | vol% | 64.79 | 33.85 | 47.45 | - |

FIG. 13

| | Conventional VLSFO | VR Fuel Oil (1) | VR Fuel Oil (2) | VR Fuel Oil (3) | VR Fuel Oil (4) | VR Fuel Oil (5) | Comp. light sweet crude |
|---|---|---|---|---|---|---|---|
| n-paraffins (vol%) | varies | 2.76 | 14.43 | 1.86 | 0.37 | 0.87 | 0.54 |
| i-paraffins (vol%) | varies | 25.85 | 17.36 | 5.97 | 7.87 | 9.52 | 2.66 |
| naphthenes (vol%) | varies | 47.40 | 41.84 | 27.59 | 55.32 | 50.87 | 27.70 |
| 1-ring aromatic ring class (vol%) | varies | 13.25 | 11.60 | 13.60 | 13.46 | 12.33 | 14.40 |
| Aromatics | varies | 23.99 | 26.37 | 64.58 | 36.44 | 38.74 | 69.11 |
| Density at 15°C (kg/m3) | 936.6 | 882.1 | 889.0 | 947.1 | 912.8 | 916.1 | 967.0 |
| KV50 (cSt) | ~110 | 3449 | 4313 | 22866 | 20850 | 10706 | 10606 |
| Sulfur (wt%) | 0.449 | 0.029 | 0.034 | 0.317 | 0.071 | 0.078 | 1.449 |
| Flash Point | >60 | 331 | 333 | 336 | 337 | 333 | 341 |
| CCAI | 818 | 724 | 729 | 776 | 742 | 750 | 801 |
| Energy content (MJ/kg) | 41.72 | 42.59 | 42.51 | 41.66 | 42.19 | 42.15 | 41.03 |
| Carbon (wt%) | ~87 | 86.00 | 86.05 | 86.53 | 86.27 | 86.37 | 86.00 |
| Hydrogen (wt%) | ~11.9 | 13.95 | 13.83 | 12.79 | 13.55 | 13.48 | 12.62 |
| Nitrogen (ppm m/m) | varies | 137 | 240 | 3940 | 1129 | 1110 | 3868 |
| Ratio of hydrogen to carbon | 1.63 | 1.93 | 1.92 | 1.76 | 1.87 | 1.86 | 1.75 |
| BMCI | varies | 19.2 | 22.3 | 49.3 | 33.0 | 35.0 | 58.0 |
| N-Heptane Insolubles (wt%) | ~2 | 0.22 | 0.22 | 0.19 | 0.03 | 0.07 | 0.78 |
| MCR (wt%) | ~4 | 0.22 | 0.51 | 6.89 | 1.70 | 2.83 | 11.86 |

FIG. 14

| Blend with Fuel Oil 4 | Distillate Blendstock 1, vol% | 98 | 80 | 70 | 50 | 45 | | |
|---|---|---|---|---|---|---|---|---|
| | Shale Fuel Oil 4, vol % | 2 | 20 | 30 | 50 | 55 | | |
| Property | Method | Result | Result | Result | Result | Result | | |
| MCR, % mass | ASTM D4530 | 0.01 | 0.12 | 0.18 | 0.29 | 0.32 | 0.30 | 2.50 |
| Density, kg/m$^3$ | D4025 | 831.8 | 842.4 | 848.2 | 860.0 | 862.9 | Max 900.0 | Max 920.0 |
| Sulfur, mg/kg | D4294 or D5453 | 16 | 124 | 183 | 299 | 327 | <1000 or <5000 | <1000 or <5000 |
| KV50, cSt | D445 | 2.5 | 3.8 | 5.0 | 9.4 | 11.3 | - | Max 10 |
| KV40, cSt | D445 | 3.0 | 4.7 | 6.3 | 12.5 | 15.3 | 2 – 11 | - |

| Blend with Fuel Oil 1 | Distillate Blendstock 1, vol% | 80 | 70 | 50 | 45 | 40 | | |
|---|---|---|---|---|---|---|---|---|
| | Shale Fuel Oil 1, vol % | 20 | 30 | 50 | 55 | 60 | | |
| Property | Method | Result | Result | Result | Result | Result | | |
| MCR, % mass | ASTM D4530 | 0.01 | 0.02 | 0.03 | 0.03 | 0.04 | 0.30 | 2.50 |
| Density, kg/m$^3$ | D4025 | 837.9 | 841.6 | 848.9 | 850.7 | 0.8526 | Max 900.0 | Max 920.0 |
| Sulfur, mg/kg | D4294 or D5453 | 32 | 47 | 74 | 81 | 88 | <1000 or <5000 | <1000 or <5000 |
| KV50, cSt | D445 | 3.6 | 4.5 | 7.7 | 8.9 | 10.4 | - | Max 10 |
| KV40, cSt | D445 | 4.4 | 5.6 | 10.1 | 11.8 | 14.0 | 2 – 11 | - |

| Blend with Fuel Oil 3 | Distillate Blendstock 1, vol% | 90 | 80 | 55 | 50 | | | |
|---|---|---|---|---|---|---|---|---|
| | Shale Fuel Oil 3, vol % | 10 | 20 | 45 | 50 | | | |
| Property | Method | Result | Result | Result | Result | | | |
| MCR, % mass | ASTM D4530 | 0.27 | 0.53 | 1.16 | 1.28 | 0.30 | 2.50 | |
| Density, kg/m$^3$ | D4025 | 838.4 | 846.2 | 865.7 | 869.6 | Max 900.0 | Max 920.0 | |
| Sulfur, mg/kg | D4294 or D5453 | 239 | 470 | 1029 | 1138 | <1000 or <5000 | <1000 or <5000 | |
| KV50, cSt | D445 | 3.0 | 3.9 | 8.5 | 10.2 | - | Max 10 | |
| KV40, cSt | D445 | 3.6 | 4.8 | 11.2 | 13.7 | 2 – 11 | - | |

HIGH NAPHTHENIC CONTENT MARINE FUEL COMPOSITIONS

CROSS-REFERENCE TO RELATED APPLICATIONS

This application is a continuation application filed under 37 C.F.R. 1.53(b) of parent application U.S. Ser. No. 16/881,293, the entirety of which is hereby incorporated herein by reference, and further claims the benefit of U.S. Provisional Application No. 63/028,688, filed on May 22, 2020, the entire contents of which are incorporated herein by reference.

FIELD

This disclosure relates to marine fuel compositions having high naphthenic content and low aromatic content, such as marine fuel oils, marine gas oils, and methods for forming such fuel compositions.

BACKGROUND

Regulatory bodies continue to mandate decreasing sulfur levels in transportation fuels to reduce SOx emissions from fuel combustion. One such example is the International Maritime Organization (IMO) mandate to reduce sulfur in marine fuel used in the open ocean to 5000 mg/kg or less, which took effect January 2020. Prior to this mandate ("IMO2020") taking effect, marine fuels used near coastal areas known as Emission Control Areas or ECAs were already required to have 1000 mg/kg or less sulfur, or in select areas 500 mg/kg or less sulfur. Inland waterways such as lakes or rivers can require even lower sulfur levels in line with on-road diesel, such as 10 mg/kg or less, or 15 mg/kg or less.

Expanding mandates create a need for more volume of low sulfur fuels for consumption by marine vessels. Typically the lower sulfur marine fuels available on the market, especially the fuels with sulfur level at or below 1000 mg/kg, have been distillates. These distillate molecules are in high demand, as they are also needed for on-road use and other applications such as home heating. Typically the production of lower sulfur fuels, especially for coastal ECAs, requires desulfurization or blending with desulfurized components due to straight-run material distilled from crude oil having higher sulfur levels.

In addition to being energy intensive, the desulfurization process increases the carbon intensity associated with marine fuel manufacturing, as the heat for the desulfurization process is typically provided by combustion of hydrocarbons. It would be desirable to develop compositions suitable for use as low sulfur marine fuels while also reducing or minimizing the amount of refinery processing associated with production of a marine fuel.

U.S. Pat. No. 8,999,011 describes vacuum gas oil fractions that can be used in fuel compositions such as fuel oils.

U.S. Patent Application Publication 2017/0183575 describes fuel compositions formed during hydroprocessing of deasphalted oils for lubricant production.

U.S. Patent Application Publication 2019/0185772 describes various marine fuel compositions, including fuel oils formed using hydrotreated vacuum resid fractions.

An article titled "Catalytic Solutions for Processing Shale Oils in the FCC" (www.digitalrefining.com, April 2014) describes bottoms fractions derived from shale oils extracted from various sources, along with methods for processing the bottoms fractions.

SUMMARY

In various aspects, marine fuels and/or fuel blending components are formed at least in part from fractions derived from selected crude oils having a low sulfur content and a high naphthenes to aromatics weight ratio and/or volume ratio. The fractions derived from the selected crude oils can have a low sulfur content, a high naphthenes to aromatics weight ratio, and a low but substantial content of aromatics. The fractions can be used as fuels or fuel blending components after fractionation and/or after blending with one or more other fractions, such as renewable fractions. For fractions that are not exposed to hydroprocessing conditions, the fractions can have characteristics that indicate a lack of hydroprocessing, such as a weight ratio of aliphatic sulfur to total sulfur of 0.2 or more and/or a weight ratio of basic nitrogen to total nitrogen of 0.2 or more.

BRIEF DESCRIPTION OF THE DRAWINGS

FIG. 3 shows modeled compositional values for atmospheric resid fractions.

FIG. 4 shows modeled compositional values for atmospheric resid fractions.

FIG. 5 shows measured and modeled compositional values for distillate fractions.

FIG. 6 shows measured and modeled compositional values for distillate fractions.

FIG. 7 shows measured and modeled compositional values for distillate fractions.

FIG. 8 shows measured and modeled compositional values for distillate fractions.

FIG. 9 shows measured and modeled compositional values for distillate fractions.

FIG. 10 shows measured compositional values for vacuum gas oil fractions.

FIG. 11 shows measured compositional values for vacuum gas oil fractions.

FIG. 12 shows modeled compositional values for vacuum gas oil fractions.

FIG. 13 shows modeled compositional values for vacuum gas oil fractions.

FIG. 14 shows modeled compositional values for vacuum resid fractions.

FIG. 15 shows modeled compositional values for blends of atmospheric resids with distillates.

DETAILED DESCRIPTION

Figure 1:
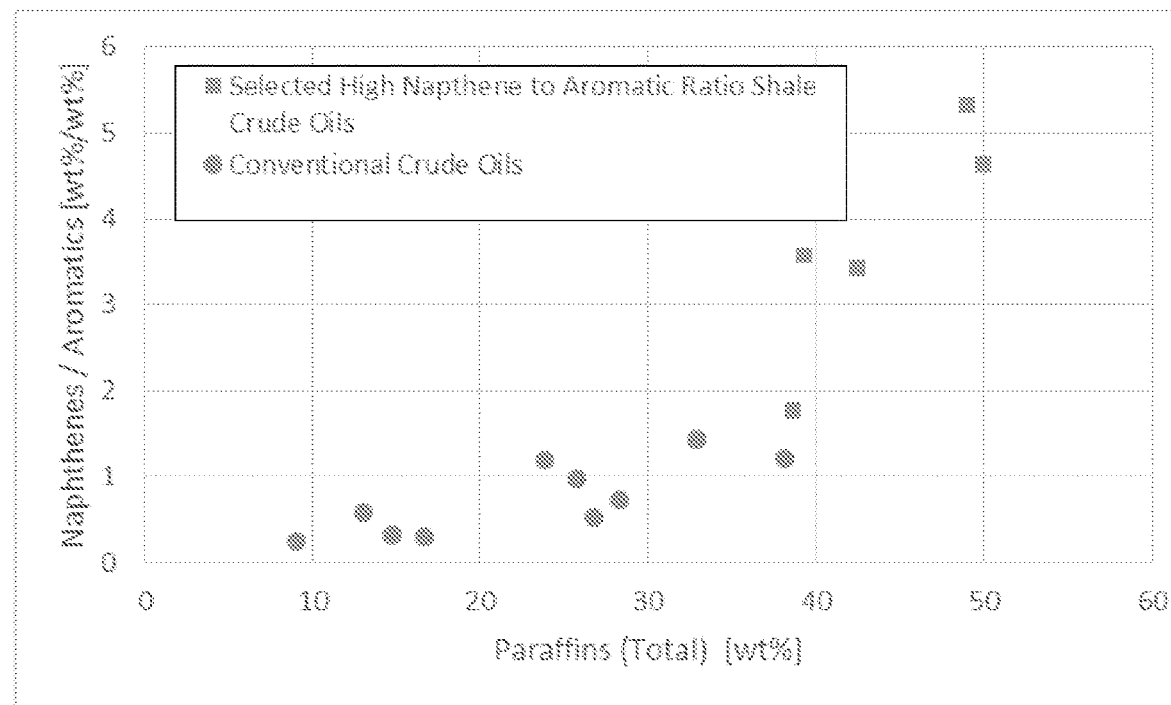
FIG. 1 shows compositional information for various crude oils.
Figure 1:
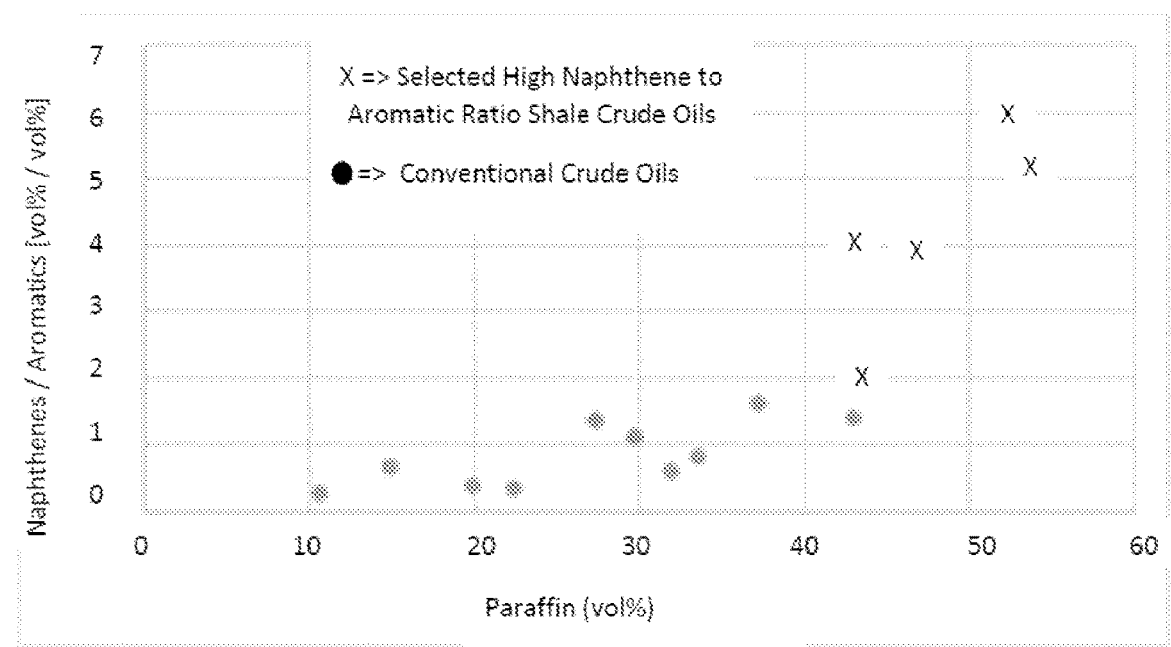

In various aspects, marine diesel fuel/fuel blending component compositions and fuel oil/fuel blending component compositions are provided that include at least a portion of a crude oil fraction having a low sulfur content and high weight ratio and/or volume ratio of naphthenes to aromatics. It has been discovered that such fractions can be used to form fuels and/or fuel blending components that have a reduced or minimized carbon intensity relative to fuels derived from conventional sources. This reduced carbon intensity is provided based in part on a combination of an unexpectedly low sulfur content, an unexpectedly high weight ratio and/or volume ratio of naphthenes to aromatics, and a low but substantial content of aromatics in the fractions derived from such crude oils. The unexpected ratio of naphthenes to aromatics contributes to the fractions further having additional unexpected properties, including low density, low kinematic viscosity, and/or high energy density. Based on this unexpected combination of features, the fractions can be suitable for production of low carbon intensity fuels and/or fuel blending components with only a reduced or minimized amount of processing. For example, distillation of a select crude oil feed into appropriate fractions can be sufficient to form some fractions that are directly usable as marine fuel and/or fuel blending components, without needing to expose the fraction(s) to hydroprocessing conditions.

By reducing, minimizing, and/or eliminating processing at various stages in the life cycle of a fuel and/or fuel blending component, a fuel or fuel blending component can be formed that has a reduced carbon intensity. In other words, due to this reduced or minimized processing, the net amount of $CO_2$ generation that is required to produce a fuel or fuel blending component and then use the resulting fuel can be reduced.

As an example, some selected shale oil fractions including a resid or bottoms portion of a shale crude can be used for production of low carbon intensity, low sulfur marine fuels, such as low sulfur fuel oils. In some aspects involving an atmospheric resid fraction, a reduced or minimized amount of processing is needed to form a marine fuel oil. This is due in part to the low density and kinematic viscosity of the atmospheric resid fraction, so that the specifications for density and kinematic viscosity can be satisfied without addition of a distillate boiling range flux. Because a distillate boiling range flux is not needed, a fuel oil formed from a low carbon intensity atmospheric resid fraction can have an unexpectedly high flash point. Additionally, hydroprocessing of the atmospheric resid fraction can be reduced, minimized, or eliminated due to the low sulfur content. By reducing or minimizing processing of the atmospheric resid fraction, in combination with reducing or minimizing the amount of blending with higher carbon intensity components, a low carbon intensity fuel oil can be formed. Such fuels can provide still further advantages based on the low nitrogen content, low n-heptane insolubles content, and/or low content of micro carbon residue (MCR).

As another example, various blending components can be added to an atmospheric or vacuum resid fraction to form low carbon intensity marine fuels with unexpectedly high ratios of naphthenes to aromatics and unexpectedly low sulfur contents. In some aspects, at least a portion of the blend components can correspond to renewable blending components.

As yet another example, distillate fractions can be used can be used to form low carbon intensity marine distillate fuels with unexpectedly high ratios of naphthenes to aromatics and unexpectedly low sulfur contents. In some aspects, at least a portion of the blend components can correspond to renewable blend components.

Recent legislation and/or regulations have created Emission Control Areas in the coastal waters of various countries. In such Emission Control Areas, marine vessels are constrained to have emissions that correspond to the expected emissions from combustion of a low sulfur fuel oil having a sulfur content of roughly 0.1 wt % or less. Similarly, recent regulations have more generally set a global sulfur limit for fuel oil of 0.5 wt % or less. Currently, relatively few types of blend stocks are commercially available that satisfy this requirement. In part, the limited availability of suitable blend stocks for low sulfur fuel oils is based on the relatively high sulfur content of the traditional feeds used for fuel oil production. The typical vacuum resid feeds used for fuel oil production often have sulfur contents of 2 wt % or more. Performing sufficient processing on such feeds to generate a low (or ultra-low) sulfur fuel oil is generally not economically favorable. Additionally, such processing can substantially increase the carbon intensity of the resulting fuel.

Crude oil production from shale oil formations has increased significantly in the past 10 years. The properties of shale oil can vary widely between shale oil formations and even within a shale oil formation. It has been unexpectedly discovered that certain types of shale oil fractions, having a high naphthene to aromatics ratio and a low sulfur content, can be beneficial for forming fuel and/or fuel blending products with reduced carbon intensity.

Due to the low sulfur content, in some aspects the selected crude oil fractions can be suitable for incorporation into low sulfur fuel oils or ultra low sulfur fuel oils with only minimal processing other than distillation. In some aspects, a crude oil fraction that is incorporated into a fuel or fuel blending product can correspond to a crude oil fraction that has not been hydroprocessed and/or that has not been cracked. In this discussion, a non-hydroprocessed fraction is defined as a fraction that has not been exposed to more than 10 psia of hydrogen in the presence of a catalyst comprising a Group VI metal, a Group VIII metal, a catalyst comprising a zeolitic framework, or a combination thereof. In this discussion, a non-cracked fraction is defined as a fraction that has not been exposed to a temperature of 400° C. or more. Optionally, hydroprocessing can be performed on a shale oil fraction to facilitate use in an ultra-low sulfur fuel.

The lower carbon intensity of a fuel containing at least a portion of a high naphthenes to aromatic ratio, low sulfur fraction can be realized by using a fuel containing at least a portion of such a high naphthenes to aromatic ratio, low sulfur fraction in any convenient type of combustion powered device. In some aspects, a fuel containing at least a portion of a high naphthenes to aromatic ratio, low sulfur fraction can be used as fuel for a combustion engine in a ground transportation vehicle, a marine vessel, or another convenient type of vehicle. Still other types of combustion devices can include generators, furnaces, and other combustion devices that are used to provide heat or power.

In addition to low sulfur content, the select crude oil fractions with a high ratio of naphthenes to aromatics can also have low nitrogen content and low micro carbon residue content. These features can further reduce emissions associated with the shale oil fractions. For example, the low micro carbon residue content and/or the low aromatics content can reduce or minimize the amount of soot produced during combustion of the shale oil fractions. The low nitrogen content can reduce or minimize the potential for formation of NOx species during combustion of the shale oil fractions.

In various aspects, a select crude oil fraction can be included as part of a fuel or fuel blending product. For convenience, unless otherwise specified, it is understood that references to incorporation of a crude oil fraction into a fuel also include incorporation of such a fraction into a fuel blending product.

Definitions

All numerical values within the detailed description and the claims herein are modified by "about" or "approximately" the indicated value, and take into account experimental error and variations that would be expected by a person having ordinary skill in the art.

In this discussion, a shale crude oil is defined as a petroleum product with a final boiling point greater than 550° C., or greater than 600° C., that is extracted from a shale petroleum source. A shale oil fraction is defined as a boiling range fraction derived from a shale crude oil.

Unless otherwise specified, distillation points and boiling points can be determined according to ASTM D2887. For samples that are not susceptible to characterization using ASTM D2887, D7169 can be used. It is noted that still other methods of boiling point characterization may be provided in the examples. The values generated by such other methods are believed to be indicative of the values that would be obtained under ASTM D2887 and/or D7169. In this discussion, the distillate boiling range is defined as 170° C. to 566° C. A distillate boiling range fraction is defined as a fraction having a T10 distillation point of 170° C. or more and a T90 distillation point of 566° C. or less. An atmospheric resid is defined as a bottoms fraction having a T10 distillation point of 149° C. or higher, or 350° C. or higher. In some aspects, an atmospheric resid can have a T90 distillation point of 550° C. or more, or 565° C. or more. A vacuum gas oil boiling range fraction can have a T10 distillation point of 350° C. or higher and a T90 distillation point of 535° C. or less. A vacuum resid is defined as a bottoms fraction having a T10 distillation point of 500° C. or higher, or 565° C. or higher. A resid-containing fraction is defined as a fraction that includes bottoms, and therefore can contain a vacuum resid and/or an atmospheric resid. It is noted that the definitions for distillate boiling range fraction, atmospheric resid, and vacuum resid are based on boiling point only. Thus, a distillate boiling range fraction or a resid-containing fraction (such as an atmospheric resid-containing fraction or a vacuum resid-containing fraction) can include components that did not pass through a distillation tower or other separation stage based on boiling point. A shale oil distillate boiling range fraction is defined as a shale oil fraction corresponding to the distillate boiling range. A shale oil atmospheric resid is defined as a shale oil bottoms fraction corresponding to an atmospheric resid. A shale oil vacuum resid is defined as a shale oil bottoms fraction corresponding to a vacuum resid.

In this discussion, a hydroprocessed fraction refers to a hydrocarbon fraction and/or hydrocarbonaceous fraction that has been exposed to a catalyst having hydroprocessing activity in the presence of 300 kPa-a or more of hydrogen at a temperature of 200° C. or more. Examples of hydroprocessed fractions include hydroprocessed distillate fractions (i.e., a hydroprocessed fraction having the distillate boiling range) and hydroprocessed resid fractions (i.e., a hydroprocessed fraction having the resid boiling range). It is noted that a hydroprocessed fraction derived from a biological source, such as hydrotreated vegetable oil, can correspond to a hydroprocessed distillate fraction and/or a hydroprocessed resid fraction, depending on the boiling range of the hydroprocessed fraction.

In this discussion, a cracked fraction refers to a hydrocarbon and/or hydrocarbonaceous fraction that is derived from the effluent of a thermal cracking or catalytic cracking process. A cracked distillate fraction (having the distillate boiling range), such as a light cycle oil from a fluid catalytic cracking process, is an example of a cracked fraction.

In this discussion, renewable blending components can correspond to renewable distillate and/or vacuum gas oil and/or vacuum resid boiling range components that are renewable based on one or more attributes. Some renewable blending components can correspond to components that are renewable based on being of biological origin. Examples of renewable blending components of biological origin can include, but are not limited to, fatty acid methyl esters (FAME), fatty acid alkyl esters, biodiesel, biomethanol, biologically derived dimethyl ether, oxymethylene ether, liquid derived from biomass, pyrolysis products from pyrolysis of biomass, products from gasification of biomass, and hydrotreated vegetable oil. Other renewable blending components can correspond to components that are renewable based on being extracted from a reservoir using renewable energy, such as petroleum extracted from a reservoir using an extraction method that is powered by renewable energy, such as electricity generated by solar, wind, or hydroelectric power. Still other renewable blending components can correspond to blending components that are made or processed using renewable energy, such as Fischer-Tropsch distillate that is formed using processes that are powered by renewable energy, or conventional petroleum distillate that is hydroprocessed/otherwise refinery processed using reactors that are powered by renewable energy. Yet other renewable blending components can correspond to fuel blending components formed from recycling and/or processing of municipal solid waste, or another source of carbon-containing waste. An example of processing of waste is pyrolysis and/or gasification of waste, such as or gasification of municipal solid waste.

More generally, high naphthenes to aromatics ratio, low sulfur content fractions (such as a selected shale oil fraction) as described herein may be blended with any of the following and any combination thereof in order to form a fuel and/or fuel blending component: low sulfur diesel (sulfur content of less than 500 wppm), ultra low sulfur diesel (sulfur content <10 or <15 ppmw), low sulfur gas oil, ultra low sulfur gasoil, low sulfur kerosene, ultra low sulfur kerosene, hydrotreated straight run diesel, hydrotreated straight run gas oil, hydrotreated straight run kerosene, hydrotreated cycle oil, hydrotreated thermally cracked diesel, hydrotreated thermally cracked gas oil, hydrotreated thermally cracked kerosene, hydrotreated coker diesel, hydrotreated coker gas oil, hydrotreated coker kerosene, hydrocracker diesel, hydrocracker gas oil, hydrocracker kerosene, gas-to-liquid diesel, gas-to-liquid kerosene, gas-to-liquid vacuum gas oil, hydrotreated vegetable oil, fatty acid methyl esters, non-hydrotreated straight-run diesel, non-hydrotreated straight-run kerosene, non-hydrotreated straight-run gas oil and any distillates derived from low sulfur crude slates, gas-to-liquid wax, and other gas-to-liquid hydrocarbons, non-hydrotreated cycle oil, non-hydrotreated fluid catalytic cracking slurry oil, non-hydrotreated pyrolysis gas oil, non-hydrotreated cracked light gas oil, non-hydrotreated cracked heavy gas oil, non-hydrotreated pyrolysis light gas oil, non-hydrotreated pyrolysis heavy gas oil, non-hydrotreated pyrolysis distillate (e.g., kerosene and/or diesel), non-hydrotreated pyrolysis residue, non-hydrotreated thermally cracked residue, non-hydrotreated thermally cracked heavy distillate, non-hydrotreated coker heavy distillates, non-hydrotreated vacuum gas oil, non-hydrotreated coker diesel, non-hydrotreated coker gasoil, non-hydrotreated coker vacuum gas oil, non-hydrotreated thermally cracked vacuum gas oil, non-hydrotreated thermally cracked diesel, non-hydrotreated thermally cracked gas oil, hydrotreated fats or oils such as hydrotreated vegetable oil, hydrotreated tall oil, etc., fatty acid methyl ester, Group 1 slack waxes, lube oil aromatic extracts, deasphalted oil, atmospheric tower bottoms, vacuum tower bottoms, steam cracker tar, any residue materials derived from low sulfur crude slates, LSFO, RSFO, other LSFO/RSFO blend stocks.

Additionally, as needed, fuel or fuel blending component fractions generated from high naphthene to aromatics ratio, low sulfur fractions and/or other blendstocks may be additized with additives such as pour point improver, cetane improver, lubricity improver, etc. to improve properties and/or meet local specifications.

With regard to characterizing properties of distillate boiling range fractions and/or blends of such fractions with other components to form distillate fuels, a variety of methods can be used. Density of a blend at 15° C. (kg/m$^3$) can be determined according ASTM D4052. Sulfur (in wppm) can be determined according to ASTM D2622. Kinematic viscosity at either 40° C. or 50° C. (in cSt) can be determined according to ASTM D445. Cetane index for a distillate fraction or a marine gas oil can be calculated according to ASTM D4737, Procedure A.

For various marine fuels, density (in kg/m$^3$) can be determined according to ISO 3675. For marine fuel oils, sulfur (in wppm) can be determined according to ISO 8754. For marine fuel oils, kinematic viscosity at 50° C. (in cSt) can be determined according ISO 3104. For marine fuel oils, pour point can be determined according to ISO 3016. For marine fuel oils, sediment can be determined according to ISO 10307-2. CCAI (calculated carbon aromaticity index) can be determined according Equation F.1 in ISO 8217:2012. Micro carbon residue content can be determined according to ASTM D4530. The content of n-heptane insolubles can be determined according to ASTM D3279. Flash point can be determined according to ASTM D93. The metals content can be determined according to ASTM D8056. Nitrogen can be determined according to D4629 for lower concentrations and D5762 for higher concentrations, as appropriate.

With regard to determining paraffin, naphthene, and aromatics contents, supercritical fluid chromatography (SFC) was used. The characterization was performed using a commercial supercritical fluid chromatograph system, and the methodology represents an expansion on the methodology described in ASTM D5186 to allow for separate characterization of paraffins and naphthenes. The expansion on the ASTM D5186 methodology was enabled by using additional separation columns, to allow for resolution of naphthenes and paraffins. The system was equipped with the following components: a high pressure pump for delivery of supercritical carbon dioxide mobile phase; temperature controlled column oven; auto-sampler with high pressure liquid injection valve for delivery of sample material into mobile phase; flame ionization detector; mobile phase splitter (low dead volume tee); back pressure regulator to keep the $CO_2$ in supercritical state; and a computer and data system for control of components and recording of data signal. For analysis, approximately 75 milligrams of sample was diluted in 2 milliliters of toluene and loaded in standard septum cap autosampler vials. The sample was introduced based via the high pressure sampling valve. The SFC separation was performed using multiple commercial silica packed columns (5 micron with either 60 or 30 angstrom pores) connected in series (250 mm in length either 2 mm or 4 mm ID). Column temperature was held typically at 35 or 40° C. For analysis, the head pressure of columns was typically 250 bar. Liquid $CO_2$ flow rates were typically 0.3 ml/minute for 2 mm ID columns or 2.0 ml/minute for 4 mm ID columns. The SFC FID signal was integrated into paraffin and naphthenic regions. In addition to characterizing aromatics according to ASTM D5186, a supercritical fluid chromatograph was used to analyze samples for split of total paraffins and total naphthenes. A variety of standards employing typical molecular types can be used to calibrate the paraffin/naphthene split for quantification.

In this discussion, the term "paraffin" refers to a saturated hydrocarbon chain. Thus, a paraffin is an alkane that does not include a ring structure. The paraffin may be straight-chain or branched-chain and is considered to be a non-ring compound. "Paraffin" is intended to embrace all structural isomeric forms of paraffins.

In this discussion, the term "naphthene" refers to a cycloalkane (also known as a cycloparaffin). Therefore, naphthenes correspond to saturated ring structures. The term naphthene encompasses single-ring naphthenes and multi-ring naphthenes. The multi-ring naphthenes may have two or more rings, e.g., two-rings, three-rings, four-rings, five-rings, six-rings, seven-rings, eight-rings, nine-rings, and ten-rings. The rings may be fused and/or bridged. The naphthene can also include various side chains, such as one or more alkyl side chains of 1-10 carbons.

In this discussion, the term "saturates" refers to all straight chain, branched, and cyclic paraffins. Thus, saturates correspond to a combination of paraffins and naphthenes.

In this discussion, the term "aromatic ring" means five or six atoms joined in a ring structure wherein (i) at least four of the atoms joined in the ring structure are carbon atoms and (ii) all of the carbon atoms joined in the ring structure are aromatic carbon atoms. Therefore, aromatic rings correspond to unsaturated ring structures. Aromatic carbons can be identified using, for example, $^{13}C$ Nuclear Magnetic Resonance. Aromatic rings having atoms attached to the ring (e.g., one or more heteroatoms, one or more carbon atoms, etc.) but which are not part of the ring structure are within the scope of the term "aromatic ring." Additionally, it is noted that ring structures that include one or more heteroatoms (such as sulfur, nitrogen, or oxygen) can correspond to an "aromatic ring" if the ring structure otherwise falls within the definition of an "aromatic ring".

In this discussion, the term "non-aromatic ring" means four or more carbon atoms joined in at least one ring structure wherein at least one of the four or more carbon atoms in the ring structure is not an aromatic carbon atom. Non-aromatic rings having atoms attached to the ring (e.g., one or more heteroatoms, one or more carbon atoms, etc.), but which are not part of the ring structure, are within the scope of the term "non-aromatic ring."

In this discussion, the term "aromatics" refers to all compounds that include at least one aromatic ring. Such compounds that include at least one aromatic ring include compounds that have one or more hydrocarbon substituents. It is noted that a compound including at least one aromatic ring and at least one non-aromatic ring falls within the definition of the term "aromatics".

It is noted that that some hydrocarbons present within a feed or product may fall outside of the definitions for paraffins, naphthenes, and aromatics. For example, any alkenes that are not part of an aromatic compound would fall outside of the above definitions. Similarly, non-aromatic compounds that include a heteroatom, such as sulfur, oxygen, or nitrogen, are not included in the definition of paraffins or naphthenes.

Life Cycle Assessment and Carbon Intensity

Life cycle assessment (LCA) is a method of quantifying the "comprehensive" environmental impacts of manufactured products, including fuel products, from "cradle to grave". Environmental impacts may include greenhouse gas (GHG) emissions, freshwater impacts, or other impacts on the environment associated with the finished product. The general guidelines for LCA are specified in ISO 14040.

The "carbon intensity" of a fuel product (e.g. marine fuel oil or marine gas oil) is defined as the life cycle GHG emissions associated with that product (g $CO_2$eq) relative to the energy content of that fuel product (MJ, LHV basis). Life cycle GHG emissions associated with fuel products must include GHG emissions associated with crude oil production; crude oil transportation to a refinery; refining of the crude oil; transportation of the refined product to point of "fill"; and combustion of the fuel product.

GHG emissions associated with the stages of refined product life cycles are assessed as follows.

(1) GHG emissions associated with drilling and well completion—including hydraulic fracturing, shall be normalized with respect to the expected ultimate recovery of sales-quality crude oil from the well.

(2) All GHG emissions associated with the production of oil and associated gas, including those associated with (a) operation of artificial lift devices, (b) separation of oil, gas, and water, (c) crude oil stabilization and/or upgrading, among other GHG emissions sources shall be normalized with respect to the volume of oil transferred to sales (e.g. to crude oil pipelines or rail). The fractions of GHG emissions associated with production equipment to be allocated to crude oil, natural gas, and other hydrocarbon products (e.g. natural gas liquids) shall be specified accordance with ISO 14040.

(3) GHG emissions associated with rail, pipeline or other forms of transportation between the production site(s) to the refinery shall be normalized with respect to the volume of crude oil transferred to the refinery.

(4) GHG emissions associated with the refining of crude oil to make liquefied petroleum gas, gasoline, distillate fuels and other products shall be assessed, explicitly accounting for the material flows within the refinery. These emissions shall be normalized with respect to the volume of crude oil refined.

(5) All of the preceding GHG emissions shall be summed to obtain the "Well to refinery" (WTR) GHG intensity of crude oil (e.g. kg $CO_2$eq/bbl crude).

(6) For each refined product, the WTR GHG emissions shall be divided by the product yield (barrels of refined product/barrels of crude), and then multiplied by the share of refinery GHG specific to that refined product. The allocation procedure shall be conducted in accordance with ISO 14040. This procedure yields the WTR GHG intensity of each refined product (e.g. kg $CO_2$eq/bbl gasoline).

(7) GHG emissions associated with rail, pipeline or other forms of transportation between the refinery and point of fueling shall be normalized with respect to the volume of each refined product sold. The sum of the GHG emissions associated with this step and the previous step of this procedure is denoted the "Well to tank" (WTT) GHG intensity of the refined product.

(8) GHG emissions associated with the combustion of refined products shall be assessed and normalized with respect to the volume of each refined product sold.

(9) The "carbon intensity" of each refined product is the sum of the combustion emissions (kg $CO_2$eq/bbl) and the "WTT" emissions (kg $CO_2$eq/bbl) relative to the energy value of the refined product during combustion. Following the convention of the EPA Renewable Fuel Standard 2, these emissions are expressed in terms of the low heating value (LHV) of the fuel, i.e. g $CO_2$eq/MJ refined product (LHV basis).

In this discussion, a low carbon intensity fuel or fuel blending product corresponds to a fuel or fuel blending product that has reduced GHG emissions per unit of lower of heating value relative to a fuel or fuel blending product derived from a conventional petroleum source. In some aspects, the reduced GHG emissions can be due in part to reduced refinery processing. For example, fractions that are not hydroprocessed for sulfur removal have reduced well-to-refinery emissions relative to fractions that require hydroprocessing prior to incorporation into a fuel. In various aspects, an unexpectedly high weight ratio of naphthenes to aromatics in a shale oil fraction can indicate a fraction with reduced GHG emissions, and therefore a lower carbon intensity.

Another indicator of a low carbon intensity fuel can be an elevated ratio of aliphatic sulfur to total sulfur in a fuel or fuel blending product. Aliphatic sulfur is generally easier to remove than other types of sulfur present in a hydrocarbon fraction. In a hydrotreated fraction, the aliphatic sulfur will typically be removed almost entirely, while other types of sulfur species will remain. The presence of increased aliphatic sulfur in a product can indicate a lack of hydroprocessing for the product. For example, a weight ratio of aliphatic sulfur to total sulfur of 0.2 or more (or 0.3 or more, such as up to 0.8 or possibly still higher) can indicate a product that has not been exposed to hydroprocessing conditions, while a weight ratio of aliphatic sulfur to total sulfur of less than 0.1 can indicate a product that has been hydroprocessed.

Still another indicator of a low carbon intensity fuel can be an elevated ratio of basic nitrogen to total nitrogen in a fuel or fuel blending product. Basic nitrogen is typically easier to remove by hydrotreatment. The presence of an increased amount of basic nitrogen in a product can therefore indicate a lack of hydroprocessing for the product. For example, a weight ratio of basic nitrogen to total nitrogen of 0.2 or more (or 0.3 or more, such as up to 0.8 or possibly still higher) can indicate a product that has not been exposed to hydroprocessing conditions, while a weight ratio of basic nitrogen to total nitrogen of less than 0.2, or less than 0.1, can indicate a product that has been hydroprocessed.

Yet another indicator of a low carbon intensity fuel or fuel blending product can be an elevated content of sodium and/or calcium in the product. Hydrotreating processes are generally effective for removal of metals during hydroprocessing, including removal of sodium and calcium. For a hydrotreated product, a typical sodium level is roughly 1 wppm or less, while a typical calcium level is roughly 1-7 wppm. By contrast, for resid fractions derived from shale crude oils with high naphthene to aromatic ratios, the sodium level without hydrotreatment is greater than 5 wppm. For example, the sodium content without hydrotreatment can be 5 wppm to 25 wppm, or 8 wppm to 25 wppm. Similarly, the calcium level without hydrotreatment can be greater than 10 wppm, such as 10 wppm to 25 wppm. The presence of such elevated levels of sodium and/or calcium in a product can indicate a lack of hydroprocessing.

Yet other ways of reducing carbon intensity for a hydrocarbon fraction can be related to methods used for extraction of a crude oil. For example, carbon intensity for a fraction can be reduced by using solar power, hydroelectric power, or another renewable energy source as the power source for equipment involved in the extraction process, either during drilling and well completion and/or during production of crude oil. As another example, extracting crude oil from an extraction site without using artificial lift can reduce the carbon intensity associated with a fuel.

Characterization of Shale Crude Oils and Shale Oil Fractions—General

Shale crude oils were obtained from a plurality of different shale oil extraction sources. Assays were performed on the shale crude oils to determine various compositional characteristics and properties for the shale crude oils. The shale crude oils were also fractionated to form various types of fractions, including fractionation into atmospheric resid fractions, vacuum resid fractions, distillate fractions (including kerosene, diesel, and vacuum gas oil boiling range fractions), and naphtha fractions. Various types of characterization and/or assays were also performed on these additional fractions.

The characterization of the shale crude oils and/or crude oil fractions included a variety of procedures that were used to generate data. For example, data for boiling ranges and fractional distillation points was generated using methods similar to compositional or pseudo compositional analysis such as ASTM D2887. For compositional features, such as the amounts of paraffins, isoparaffins, olefins, naphthenes, and/or aromatics in a crude oil and/or crude oil fraction, data was generated using analytical techniques such as high pressure liquid chromatography (HPLC) and/or gas chromatography-mass spectrometry (GC-MS). Data related to pour point was generated using methods similar to ASTM D97. Data related to cloud point was generated using methods similar to ASTM D2500 and/or ASTM D5773. Data related to flash point was generated based on volatility calculations. Data related to sulfur content and nitrogen content of a crude oil and/or crude oil fraction was generated using methods similar to ASTMD2622, ASTM D4294, ASTM D5443, ASTM D4629, and/or ASTM D5762. Data related to carbon content and/or hydrogen content was calculated based on the compositional analysis. Data related to density (such as density at 15° C.) was generated using methods similar to ASTM D1298 and/or ASTM D4052. Data related to kinematic viscosity (such as kinematic viscosity at 40° C. or 50° C.) was generated using methods similar to ASTM D445 and/or ASTM D7042. Data related to micro carbon residue (MCR) content was generated using methods similar to ASTM D189 and/or ASTM D4530. Data related to cetane index was calculated from fractional distillation using techniques similar to those represented in the American Petroleum Institute Technical Data Book. Data related to acid number was generated using methods similar to ASTM D664, ASTM D3242, ASTM D8045.

The data and other measured values for the shale crude oils and shale oil fractions were then incorporated into an existing data library of other representative conventional and non-conventional crude oils for use in an empirical model. The empirical model was used to provide predictions for compositional characteristics and properties for some additional shale oil fractions that were not directly characterized experimentally. In this discussion, data values provided by this empirical model will be described as modeled data. In this discussion, data values that are not otherwise labeled as modeled data correspond to measured values and/or values that can be directly derived from measured values.

Figure 2:
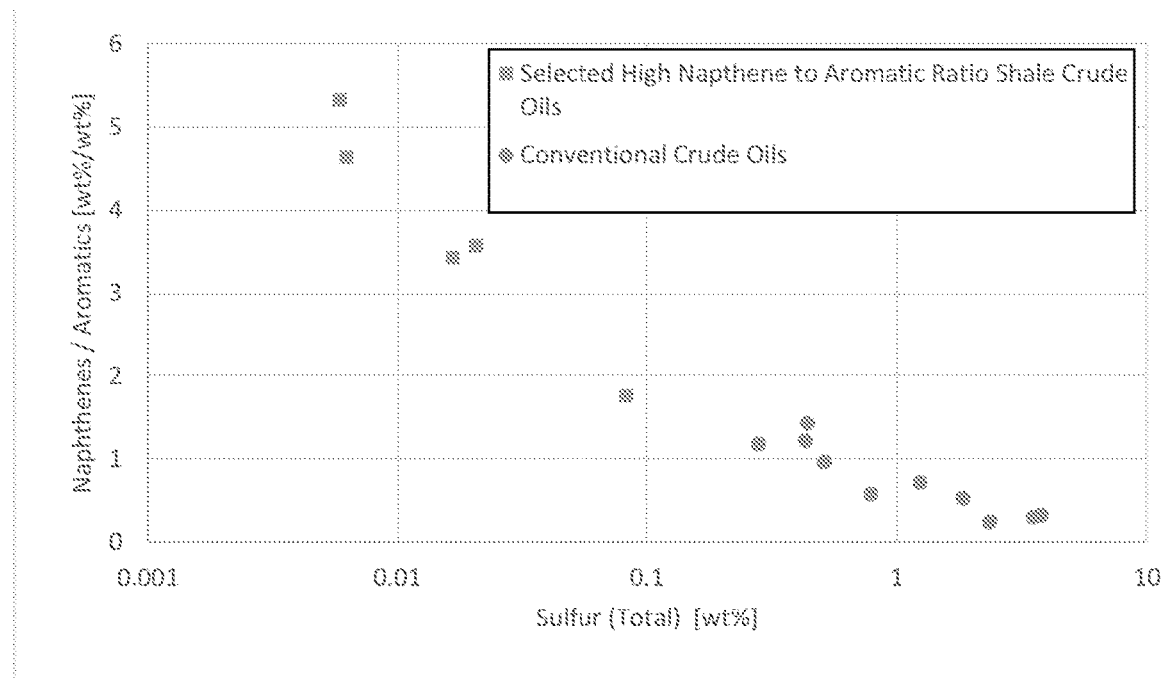
FIG. 2 shows compositional information for various crude oils.
Figure 2:
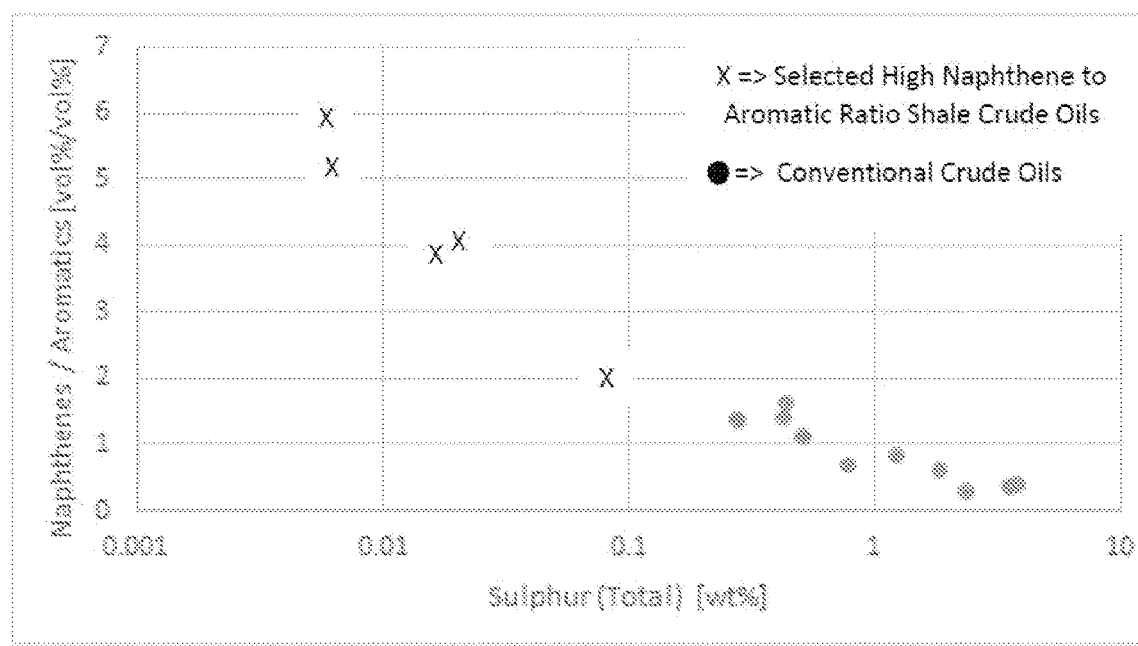

FIGS. 1 and 2 show examples of the unexpected combinations of properties for shale crude oils that have a high weight ratio and/or volume ratio of naphthenes to aromatics. In FIG. 1, both the weight ratio and the volume ratio of naphthenes to aromatics is shown for five shale crude oils relative to the weight/volume percentage of paraffins in the shale crude oil. The top plot in FIG. 1 shows the weight ratio of naphthenes to aromatics, while the bottom plot shows the volume ratio. A plurality of other representative conventional crudes are also shown in FIG. 1 for comparison. As shown in FIG. 1, the selected shale crude oils described herein have a paraffin content of greater than 40 wt % while also having a weight ratio of naphthenes to aromatics of 1.8 or more. Similarly, as shown in FIG. 1, the selected shale crude oils described herein have a paraffin content of greater than 40 vol % while also having a weight ratio of naphthenes to aromatics of 2.0 or more. By contrast, none of the conventional crude oils shown in FIG. 1 have a similar combination of a paraffin content of greater than 40 wt % and a weight ratio of naphthenes to aromatics of 1.8 or more, or a combination of paraffin content of greater than 40 vol % and a weight ratio of naphthenes to aromatics of 2.0 or more. It has been discovered that this unexpected combination of naphthenes to aromatics ratio and paraffin content is present throughout various fractions that can be derived from such selected crude oils.

In FIG. 2, both the volume ratio and weight ratio of naphthenes to aromatics is shown for the five shale crude oils in FIG. 1 relative to the weight of sulfur in the crude. The sulfur content of the crude in FIG. 2 is plotted on a logarithmic scale. The top plot in FIG. 2 shows the weight ratio of naphthenes to aromatics, while the bottom plot shows the volume ratio. The plurality of other representative conventional crude oils are also shown for comparison. As shown in FIG. 2, the selected shale crude oils have naphthene to aromatic volume ratios of 2.0 or more, while all of the conventional crude oils have naphthene to aromatic volume ratios below 1.8. Similarly, as shown in FIG. 2, the selected shale crude oils have naphthene to aromatic weight ratios of 1.8 or more, while all of the conventional crude oils have naphthene to aromatic weight ratios below 1.6. Additionally, the selected shale crude oils have a sulfur content of roughly 0.1 wt % or less, while all of the conventional crude oils shown in FIG. 2 have a sulfur content of greater than 0.2 wt %. It has been discovered that this unexpected combination of high naphthene to aromatics ratio and low sulfur is present within various fractions that can be derived from such selected crude oils. This unexpected combination of properties contributes to the ability to produce low carbon intensity fuels from shale oil fractions and/or blends of shale oil fractions derived from the shale crude oils.

It is noted that due to the difference in density between naphthenes and aromatics, the naphthenes to aromatics volume ratios shown in FIGS. 1 and 2 are roughly 10%-12% greater than the naphthenes to aromatics weight ratios in FIGS. 1 and 2. It is believed that this difference is also present for the various other fractions described herein.

Characterization of Shale Oil Fractions—Atmospheric Resids and Corresponding Fuel Oils In some aspects, an atmospheric resid fraction of a shale oil as described herein or a fraction including both distillate and atmospheric resid can be used as a marine fuel oil or as a blending component for a marine fuel oil. The combination of low sulfur, high naphthene to aromatics ratio, low density, and low kinematic viscosity can allow an atmospheric resid fraction to be used as a marine fuel oil with reduced or minimized processing, such as possibly using the fraction as a fuel oil after distillation without further processing.

FIG. 3 shows modeled data for atmospheric resid fractions formed from shale crude oils with high naphthene to aromatics weight ratios/volume ratios. FIG. 3 also shows modeled values for an atmospheric resid fraction formed from a representative light sweet crude. Additionally, FIG. 3 shows typical properties for a conventional very low sulfur fuel oil (VLSFO), as well as some of the specifications for an RME 180 VLSFO fuel oil according to ISO 8217. The modeled atmospheric resid fractions have an initial boiling point of 371° C., a T10 distillation point between 390° C. and 405° C., and a T90 distillation point between 575° C. and 620° C.

As shown in FIG. 3, all of the modeled high naphthene to aromatics ratio, low sulfur atmospheric resid fractions derived from shale crude oil sources have a lower sulfur content than the conventional atmospheric resid fraction. The sulfur content for the shale atmospheric resid fractions is less than 0.25 wt %, and is less than 0.07 wt % for four of the five fractions, or less than 0.05 wt %, such as down to 0.005 wt %. Additionally, because the modeled atmospheric resid fractions have not been hydroprocessed, the weight ratio of aliphatic sulfur to total sulfur ranges from 0.35 to 0.76. Thus, the modeled atmospheric resid fractions have a weight ratio of aliphatic sulfur to total sulfur of greater than 0.2, or greater than 0.3. This is in contrast to a hydroprocessed fraction, which would be expected to have a weight ratio of aliphatic sulfur to total sulfur of 0.1 or less.

The modeled high naphthene to aromatics ratio, low sulfur atmospheric resid fractions derived from shale crude oil sources also have a lower nitrogen content than the conventional atmospheric resid fraction. The nitrogen content for the shale atmospheric resid fractions is less than 2000 wppm, and is less than 800 wppm for four of the five fractions, or less than 600 wppm, such as down to 25 wppm or possibly still lower. Additionally, because the modeled atmospheric resid fractions have not been hydroprocessed, the weight ratio of basic nitrogen to total nitrogen ranges from 0.30 to 0.37. Thus, the modeled atmospheric resid fractions have a weight ratio of basic nitrogen to total nitrogen of greater than 0.2, or greater than 0.3. This is in contrast to a hydroprocessed fraction, which would be expected to have a weight ratio of basic nitrogen to total nitrogen less than 0.2, or less than 0.1.

The modeled high naphthene to aromatics ratio, low sulfur atmospheric resid fractions also have a lower kinematic viscosity at 50° C., and a lower density at 15° C. than the conventional atmospheric resid fraction. The density for the shale atmospheric resid fractions is less than 915 kg/m$^3$ for the shale atmospheric resid fractions, and is less than 900 kg/m$^3$ for four of the five fractions, or less than 890 kg/m$^3$, such as down to 855 kg/m$^3$. The kinematic viscosity at 50° C. is less than 180 cSt for the shale atmospheric resid fractions or less than 160 cSt. For four of the five fractions, the kinematic viscosity at 50° C. is less than 130 cSt, or less than 110 cSt, such as down to 30 cSt. Additionally, all of the shale atmospheric resid fractions have a volume ratio of naphthenes to aromatics of greater than 0.8. Four of the five fractions have a volume ratio of naphthenes to aromatics of 1.5 or more, or 2.0 or more, or 2.5 or more, such as up to 6.0 or possibly still higher. This corresponds to all of the shale atmospheric resid fractions having weight ratio of naphthenes to aromatics of greater than 0.75. Four of the five fractions have a weight ratio of naphthenes to aromatics of 1.5 or more, or 1.8 or more, or 2.0 or more, or 2.5 or more, such as up to 6.0 or possibly still higher.

It is noted that the kinematic viscosity at 50° C. of the atmospheric resid from the conventional light sweet crude oil is greater than 180 cSt. As a result, the conventional atmospheric resid does not meet the specifications for an RME 180 fuel oil without some type of modification, such as blending with a distillate flux. Additionally, it is noted that the sulfur content of the atmospheric resid from the conventional light sweet crude oil is greater than 0.5 wt %. This means that some type of hydroprocessing or other sulfur treatment (or possibly blending with a sufficient amount of low sulfur distillate) would be needed for the atmospheric resid from the light sweet crude to be used as a fuel oil (such as RMA 10).

Since blending and hydroprocessing would be needed anyway, fuel oils are not conventionally made from atmospheric resid fractions. Instead, a further distillation is usually performed to form a vacuum resid fraction. This potentially allows additional value to be captured for the 370° C.-565° C. portion of the atmospheric resid by allowing this lower boiling fraction to be incorporated into higher value products. A vacuum resid fraction, however, typically has a kinematic viscosity at 50° C. that is substantially higher than the specification for use as a fuel oil. In order to meet fuel oil specifications, a distillate is typically blended with the vacuum resid fraction to correct the kinematic viscosity to a desired level. The addition of distillate typically reduces the flash point of the resulting blend to just above the minimum flash point for a fuel oil of roughly 60° C. By contrast, the shale oil atmospheric resid fractions shown in FIG. 3 have a sufficiently low kinematic viscosity to used without addition of a distillate flux. As a result, a fuel oil formed based on a shale oil atmospheric resid fraction can have a flash point of 100° C. or more, or 120° C. or more, or 150° C. or more, or 200° C. or more, such as up to 250° C. or possibly still higher.

The shale oil atmospheric resid fractions in FIG. 3 have still other potentially beneficial features. These features can include a naphthenes content of 30 vol % to 60 vol %, or 35 vol % to 60 vol %, or 40 vol % to 60 vol %, or 45 vol % to 60 vol %; or expressed as wt %, a naphthenes content of 30 wt % to 55 wt %, or 35 wt % to 55 wt %, or 40 wt % to 55 wt %, or 45 wt % to 55 wt %. Another feature can be an aromatics content of 45 wt %/45 vol % or less, or 35 wt %/35 vol % or less, or 30 wt %/30 vol % or less, or 25 wt %/25 vol % or less, such as down to 10 wt %/10 vol % or possibly lower. Yet another feature can be an unexpectedly low micro carbon residue for a resid fraction, such as a micro carbon residue of 2.5 wt % or less, or 1.0 wt % or less, such as down to 0.05 wt % or possibly still lower. Still other features can include a hydrogen content of 11.0 wt % or more; a nitrogen content of 2000 wppm or less, or 1000 wppm or less; a BMCI of 20 to 40, or 20 to 35; an n-heptane insolubles content of 0.01 wt % to 0.2 wt %, or 0.01 wt % to 0.1 wt %; and a CCAI of 790 or less, or 770 or less, such as down to 740 or possibly still lower.

For a fuel oil made from a shale oil atmospheric resid fraction as shown in FIG. 3, still other characteristics of the fuel oil can be related to compositional differences that can be found in fractions that are not exposed to hydrotreating conditions. As noted above, aliphatic sulfur is typically easily removed from a petroleum fraction, while other types of sulfur are removed more slowly. In some aspects, since hydrotreating is not necessary to reduce the sulfur level, a fuel oil made from an atmospheric resid fraction with a high naphthene to aromatics ratio can have an elevated ratio of aliphatic sulfur to total sulfur in the fuel oil. Similarly, the amount of basic nitrogen (more easily removed under hydroprocessing conditions) can be high relative to the amount of total nitrogen. Additionally, by avoiding the need for hydroprocessing, the amount of sodium and/or calcium in the fuel oil can be higher than a conventional low sulfur or very low sulfur fuel oil.

FIG. 4 shows modeled compositional values and properties for an alternative type of resid fraction that includes both distillate and atmospheric resid. The modeled fractions in FIG. 4 could be formed, for example, by distilling off the naphtha (and lighter) portions of a shale crude oil. This can allow for still lower carbon intensity when producing a fuel oil, such as an RMA 10 very low sulfur fuel oil according to Table 1 of ISO 8217. FIG. 4 also shows modeled values for a corresponding fraction formed from the representative light sweet crude. Additionally, FIG. 4 shows typical properties for a conventional VLSFO, as well as some of the specifications for an RMA 10 VLSFO fuel oil according to ISO 8217. The modeled fractions in FIG. 4 have an initial boiling point of roughly 180° C., a T10 distillation point between 189° C. to 195° C., and a T90 distillation point between 480° C. and 550° C.

As shown in FIG. 4, all of the high naphthene to aromatics ratio, low sulfur fuel oils derived from shale crude oil sources have a lower sulfur content than the conventional distillate plus atmospheric resid fraction. The sulfur content for the shale alternative atmospheric resid fractions is less than 0.15 wt %, and is less than 0.05 wt % for four of the five fractions, such as down to 0.002 wt %. Additionally, because the modeled atmospheric resid fractions have not been hydroprocessed, the weight ratio of aliphatic sulfur to total sulfur ranges from 0.33 to 0.76. Thus, the modeled atmospheric resid fractions have a weight ratio of aliphatic sulfur to total sulfur of greater than 0.2, or greater than 0.3. This is in contrast to a hydroprocessed fraction, which would be expected to have a weight ratio of aliphatic sulfur to total sulfur of 0.1 or less.

As shown in FIG. 4, all of the high naphthene to aromatics ratio, low sulfur fuel oils derived from shale crude oil sources have a lower nitrogen content than the conventional distillate plus atmospheric resid fraction. The nitrogen content for the shale alternative atmospheric resid fractions is less than 850 wppm, and is less than 250 wppm for four of the five fractions, such as down to 10 wppm. Additionally, because the modeled alternative atmospheric resid fractions have not been hydroprocessed, the weight ratio of basic nitrogen to total nitrogen ranges from 0.29 to 0.36. Thus, the modeled alternative atmospheric resid fractions have a weight ratio of basic nitrogen to total nitrogen of greater than 0.2, and greater than 0.3 for four of the five fractions. This is in contrast to a hydroprocessed fraction, which would be expected to have a weight ratio of basic nitrogen to total nitrogen less than 0.2, or less than 0.1.

As shown in FIG. 4, all of the high naphthene to aromatics ratio, low sulfur fuel oils derived from shale crude oil sources also have a lower kinematic viscosity at 50° C. and a lower density at 15° C. than the conventional atmospheric resid fraction. The sulfur content for the shale atmospheric resid fractions is less than 0.15 wt %, and is less than 0.05 wt % for four of the five fractions, such as down to 0.002 wt %. The density for the shale atmospheric resid fractions is less than 860 kg/m$^3$ for the shale atmospheric resid fractions, and is less than 850 kg/m$^3$ for four of the five fractions, or less than 845 kg/m$^3$, such as down to 810 kg/m$^3$. The kinematic viscosity at 50° C. is less than 6.2 cSt for the shale atmospheric resid fractions, and is less than 5.5 cSt for four of the five fractions, or less than 5.0 cSt, such as down to 3.2 cSt.

Additionally, all of the shale distillate plus atmospheric resid fractions have a weight ratio and volume ratio of naphthenes to aromatics of greater than 1.5, and four of the five fractions have a weight ratio and volume ratio of naphthenes to aromatics of greater than 2.0, or greater than 3.0, such as up to 6.0 or possibly still higher. Relative to the atmospheric resids shown in FIG. 3, the alternative resid fractions in FIG. 4 have higher paraffin contents in exchange for lower aromatic contents.

The shale oil resid fractions in FIG. 4 have still other potentially beneficial features. These features can include a naphthenes content of 40 vol % to 55 vol %, or 43 vol % to 55 vol % (or 38 wt % to 55 wt %, or 40 wt % to 55 wt %). Another feature can be an aromatics content of 28 wt %/28 vol % or less, or 20 wt %/20 vol % or less, or 15 wt %/15 vol % or less, such as down to 5.0 wt %/5 vol % or possibly lower. Yet another feature can be an unexpectedly low micro carbon residue for a resid fraction, such as a micro carbon residue of 1.0 wt % or less, or 0.5 wt % or less, such as down to 0.02 wt % or possibly still lower. Still other features can include a hydrogen content of 13.5 wt % or more (or 13.9 wt % or more); a nitrogen content of 850 wppm or less, or 250 wppm or less; a BMCI of 20 to 35, or 20 to 30; an n-heptane insolubles content of 0.05 wt % or less, or 0.03 wt % or less, such as down to 0.01 wt %; and a CCAI of 790 or less, or 780 or less, such as down to 740 or possibly still lower.

Fuel Oil and Marine Gas Oil Blends Including Shale Oil Atmospheric Resids

In various examples below, a variety of refinery fractions, renewable fractions and finished fuels are used as representative blending components for the formation of fuel blends. The fuel blends are formed by blending one or more low sulfur, high naphthene to aromatic ratio shale oil fractions with one or more of the refinery fractions, renewable fractions, or finished fuels.

As described above, atmospheric resid fractions derived from low sulfur, high naphthene to aromatic shale oils can be used as fuel oils after reduced or minimized amounts of processing. This can have a corresponding effect of reducing or minimizing the carbon intensity of the resulting fuel due to refinery processing. In addition to using the low carbon intensity atmospheric resids as fuel oils, the atmospheric resids can also be blended with other low carbon intensity fractions to form still lower carbon intensity fuels.

As an example, distillates derived from biological sources can have a substantially lower carbon intensity, due in part to the consumption of carbon during the formation of the biomass. By blending a low carbon intensity atmospheric resid with a biodiesel (or other renewable distillate fraction) can result in a fuel or fuel blending component with a reduced or minimized carbon intensity. Blending a shale oil atmospheric resid fraction with biodiesel can also provide unexpected synergistic advantages. For example, shale oil atmospheric resids can tend to have a relatively high pour point, so the biodiesel can also act as a pour point corrector. Biodiesel can also tend to have high solvency for asphaltenes, so blending biodiesel with a shale oil atmospheric resid can improve the ability to combine the resulting blended product with other resid fractions.

Another potential blending route for low carbon intensity atmospheric resids can be to blend an atmospheric resid with a low sulfur distillate blendstock (such as ultra low sulfur diesel) to form marine gas oils and/or very low sulfur fuel oils. It has been discovered that substantially larger amounts of low carbon intensity atmospheric resids can be blended with conventional distillate fuels while still forming a marine gas oil that satisfies the requirements of a DMB and/or DFB marine gas oil according to ISO 8217. In particular, due to the unexpectedly low micro carbon residue of the atmospheric resids, blends of up to 50 vol % atmospheric resid with 50 vol % distillate can be formed while still meeting the requirements of a DMB or DFB marine gas oil. Blends containing up to 55 vol % atmospheric resid with distillate can also be formed while satisfying the specifications for a fuel oil, such as a RMA 10 fuel oil according to ISO 8217. Thus, blends including 1.0 vol % to 50 vol % of atmospheric resid, or 1.0 vol % to 55 vol % atmospheric resid, can be used to form marine gas oils.

The first two columns of Table 1 show two types of biodiesels that were used as blend components for modeling of the formation of fuel oils and marine gas oils. The third column shows a commercial ultra low sulfur diesel that was used for modeling of blending with shale oil atmospheric resid to form fuel oils and marine gas oils.

TABLE 1

Atmospheric Resid Blend Components (Modeled)

|  | Biodiesel 1 | Biodiesel 2 | ULSD |
|---|---|---|---|
| Density at 15° C. (kg/m3) | 881.1 | 879.6 | 830.6 |
| KV50 (cSt) | 3.5 | 3.734 | 2.362 |
| Sulfur (ppm m/m) | ~5 | ~5 | 0.00039 |
| CCAI | 828 | 824 |  |
| BMCI | 55 | 80 | 26.8 |
| TE | 0 | 0 |  |
| MCR (wt %) | 0 | 0 | 0 |
| Cloud Point | −1 | >1 |  |
| Pour Point (° C.) | <−5 | 6 |  |

Table 2 shows modeling results for blending atmospheric resids from FIG. 3 with varying amounts of biodiesel.

TABLE 2

Low Carbon Intensity Fuel Oil Blends (Modeled)

|  | ISO8217 RMD80 Spec | 90% FO1 + 10% Biodiesel 1 | 95% FO3 + 5% Biodiesel 1 | 40% FO3 + 60% Biodiesel 1 | 40% FO3 + 60% Biodiesel 2 |
|---|---|---|---|---|---|
| Density at 15° C. (kg/m3) | <990 | 0.8684 | 0.9071 | 892.1 | 891.2 |
| KV50 (cSt) | <80 | 35.3 | 105 | 10.1 | 10.6 |
| Sulfur (wt %) | <0.50 | 126 | 0.207 | 0.089 | 0.089 |
| CCAI | <860 | 760 | 783 | 809 | 807 |
| BMCI | — | 28 | 41 | 49 | 64 |
| TE | — | 0 | 0 | 0 | 0 |
| N-Heptane Insolubles (wt %) | — | 0.04 | 0.07 | 0.03 | 0.03 |
| MCR (wt %) | <14 | 0.05 | 2.33 | 1.00 | 1.00 |
| Pour Point (° C.) | <30 | ~30 | ~29 | ~9 | ~16 |

As shown in Table 2, low carbon intensity fuel oils that satisfy the specifications for an RMD80 fuel oil can be formed with blends ranging from 5 vol % to 60 vol % in biodiesel, with the balance (40 vol % to 95 vol %) corresponding to low carbon intensity atmospheric resid. Because of the low, sulfur content, density, and kinematic viscosity of the low carbon intensity atmospheric resid fractions, even addition of 5 vol % of biodiesel can result in a blend with satisfactory properties. Additionally, addition of 5 vol % or 10 vol % of biodiesel can be sufficient to form a blended fuel oil product with a pour point of 30 or less. More generally, low carbon fuels can be formed that include 5 wt % to 95 wt % of a shale oil atmospheric resid having a high naphthene to aromatic ratio and a low sulfur content. Also more generally, any convenient type of renewable distillate oil can be used, such as biodiesel, hydrotreated vegetable oil, or another convenient distillate boiling range fraction derived from a renewable source.

Modeling was also used to combine the atmospheric resids of FIG. 3 with a commercial ultra low sulfur diesel (ULSD) fraction to form potential marine gas oils or fuel oils. Based on the modeling, in contrast to conventional blends of distillates with resid fractions, it was discovered that compatibility and/or sediment formation was not a primary factor in determining whether a blend could form a fuel that satisfied one or more fuel specifications. Instead, it was discovered that the micro carbon residue content was the controlling factor. Due to the low micro carbon residue content of the low carbon intensity atmospheric resid fractions, it was discovered that substantial amounts of atmospheric resid could be added.

FIG. 15 shows modeling results for blending of fuel oils (i.e., modeled atmospheric resids) from FIG. 3 with the ULSD fraction. As shown in FIG. 15, for fuel oil 4, between 30 vol % and 50 vol % of atmospheric resid could be included in the blend while still satisfying the requirements for a DMB or DFB gas oil. Further addition of fuel oil 4 resulted in a micro carbon residue value outside of the gas oil specification. However, addition of 50 vol % of fuel oil 4 still provided a sufficiently low micro carbon residue value to satisfy the specifications for a RMA 10 fuel oil. For fuel oil 1, between 50 vol % and 55 vol % of the atmospheric resid could be included in the blend while satisfying the specification for a DMB or DFB gas oil, while 55 vol % of atmospheric resid could be included while satisfying the specifications for a RMA 10 fuel oil. For fuel oil 3, between 10 vol % and 20 vol % of the atmospheric resid could be included in the blend while satisfying the specification for a DMB or DFB gas oil, while 45 vol % of atmospheric resid could be included while satisfying the specifications for a RMA 10 fuel oil.

In contrast to the above results, when blending commercial ULSD with various types of commercial low sulfur fuel oils, addition of even 5 vol % of commercial fuel oil to the blend would result in a micro carbon residue content in excess of the specification for a DMB or DFB gas oil. Additionally, between only 10 vol % and 20 vol % of commercial fuel oil could be added to the commercial ULSD while still meeting the micro carbon residue specification for a RMA 10 fuel oil.

Table 3 shows properties for conventional ultra low sulfur diesels and conventional resid fractions. Table 3 shows properties for the conventional diesel and resid fractions. It is noted that comparative distillate blendstocks A and B correspond to ultra low sulfur diesel fuels, while the comparative resid blendstocks A and B both correspond to commercially available fuel oils.

TABLE 3

Comparative Distillate and Resid Blendstocks

| Property | Test Method | Comp. Distillate Blendstock A | Comp. Resid Blendstock A | Comp. Distillate Blendstock B | Comp. Resid Blendstock B |
|---|---|---|---|---|---|
| Density at 15° C., kg/L | ASTM D4052 | 0.8286 | 0.9643 | 0.8502 | 976.6 |
| Sulfur, wt % | ASTM D4294 or ASTM D5453 | 0.00054 | 2.59 | 0.0003 | 1.3 |
| KV50, cSt | ASTM D445 | — | 351.8 | 2.435 | 410.5 |

TABLE 3-continued

Comparative Distillate and Resid Blendstocks

| Property | Test Method | Comp. Distillate Blendstock A | Comp. Resid Blendstock A | Comp. Distillate Blendstock B | Comp. Resid Blendstock B |
|---|---|---|---|---|---|
| Sediment, wt % | ISO 10307-2 | 0 | 0.01 | 0 | — |
| Asphaltene Content, wt % | IP 143 | 0 | 5.3 | 0 | 2.6 |
| Micro Carbon Residue, % mass | ASTM D4530 | 0 | 15.5 | 0 | 12.6 |

Table 4 shows blend compositions produced by blending various amounts of Comparative Distillate Blendstock A and Comparative Resid Blendstock A. As shown in Table 4, addition of 2 vol % of the resid blendstock results in a micro carbon residue content that is too high to satisfy the DMB specification. Addition of 5 vol % of resid blendstock results in a micro carbon residue content that is too high to satisfy the RMA10 specification.

TABLE 4

Blends Based on Distillate Blendstock A and Resid Blendstock A

| Property | Blend # Distillate Blendstock 2, vol % Resid Blendstock 2, vol % Method | 1 99 1 Result | 2 98 2 Result | 3 95 5 Result | 4 90 10 Result | 5 80 20 Result | ISO 8217 DMB/DFB | ISO 8217 RMA 10 |
|---|---|---|---|---|---|---|---|---|
| Sediment, % mass | 10307-2* | 0.01 | 0.01 | 0.01 | 0.01 | 0.01 | Max 0.1 | Max 0.1 |
| MCR, % mass | ASTM D4530 | 0.21† | 0.41† | 0.91† | 1.81† | 3.51† | 0.30 | 2.50 |

As another comparative example, Comparative Distillate Blendstock B and Comparative Resid Blendstock B were blended in a volume ratio of 70 vol % distillate to 30 vol % to resid. This resulted in a blended composition that contained 3.6 wt % of micro carbon residue, which is well above the specification for either a DMB or an RMA10 fuel. This blend also resulted in a sediment mass of 0.2 wt %, which is greater than the fuel specification value.

Characterization of Shale Oil Fractions—Distillate Fractions and Corresponding Marine Gas Oils In some aspects, a distillate fraction of a shale oil as described herein can be used as a marine gas oil or as a blending component for a marine gas oil. The combination of low sulfur, high naphthene to aromatics ratio, low density, and low kinematic viscosity can allow a distillate fraction to be used as a marine gas oil with reduced or minimized processing, such as possibly using the fraction as a marine gas oil after distillation without further processing.

FIG. 5 shows measured data for distillate boiling range fractions derived from seven different shale oil and/or shale oil blends. The distillate cuts shown in FIG. 5 are narrow distillate cuts, with a T10 distillation point of roughly 290° C.-300° C. and a T90 distillation point of roughly 350° C. to 360° C. This corresponds roughly to a heavy diesel fraction after removing a jet fuel or kerosene portion. As shown in FIG. 5, these distillate fractions derived from shale crude oils and/or blends of shale crude oils had a relatively low specific gravity at 15° C. of 830 kg/m³ to 860 kg/m³, which indicates the presence of an unexpectedly high ratio of naphthenes to aromatics in the distillate fractions. The distillate fractions also had other unexpected combinations of properties, including an unexpectedly high derived cetane number of 60-72, or 62-72; a sulfur content of less than 0.1 wt %, or less than 0.05 wt %, or less than 0.025 wt %; and a nitrogen content of less than 200 wppm, or less than 100 wppm.

FIG. 6 shows modeled data for distillate boiling range fractions (including a portion of kerosene boiling range compounds) derived from the first five shale crude oils shown in FIG. 5. The modeled distillate fractions shown in FIG. 6 have an initial boiling point of 148° C. and a final boiling point of 432° C. This results in a modeled T10 distillation point of 185° C. to 195° C. and a T90 distillation point of 365° C. to 385° C. More generally, the T10 distillation point can be between 150° C. and 230° C. As shown in the modeled compositional values and properties in FIG. 6, the distillate fractions have an unexpectedly high weight ratio and/or volume ratio of naphthenes (cycloparaffins) to aromatics of 2.5 or more, or 3.0 or more, such as up to 8.0 or possibly still higher, while also including 5.0 wt % to 18 wt % aromatics, or 5.0 wt % to 15 wt %, or 5.0 wt % to 12 wt % (or 5.0 vol % to 18 vol %, or 5.0 vol % to 15 vol %, or 5.0 vol % to 12 vol %). The distillate fractions further have an unexpected combination of a low density at 15° C. of 810 kg/m³ to 835 kg/m³ (or 810 kg/m³ to 830 kg/m³); an energy content of 42.9 MJ/kg or greater; a low kinematic viscosity at 40° C. of 2.5 cSt to 2.8 cSt; a low sulfur content of 0.004 wt % to 0.01 wt %, or 0.005 wt % to 0.009 wt %; a low nitrogen content of 150 wppm or less, or 100 wppm or less, or 50 wppm or less, such as down to 1.0 wppm; and an acid number of less than 0.1 mg KOH/kg, or less than 0.08 mg KOH/kg. More generally, the kinematic viscosity at 40° C. can be 2.0 cSt to 4.0 cSt, or 2.5 cSt to 3.2 cSt. The distillate boiling range fractions can also have a cetane index of 45 or more, or 49 or more, such as up to 65 or possibly still higher. Based on the sulfur content, density, and kinematic viscosity, the distillate boiling range fractions in FIG. 6 can be used as a marine gas oil with a reduced or minimized amount of additional processing. For example, the distillate boiling range fractions in FIG. 6 can be used as a DMA marine gas oil after distillation to form the distillate boiling range fraction.

FIG. 7 shows comparative data corresponding to modeled distillate boiling range fractions with comparable boiling ranges relative to FIG. 6 from three representative conventional crudes. Comparative distillate fraction A corresponds to a fraction derived from a light sweet crude. Comparative distillate fractions B and C correspond to fractions derived from heavy sour crudes. FIG. 7 further shows some specifications for forming a DMA marine gas oil according to ISO 8217.

As shown in FIG. 7, the comparative distillate fractions have weight ratios/volume ratios of naphthenes to aromatics that are less than 2.5, as well as sulfur contents of 0.3 wt % or more. Based on the sulfur content, any of the comparative fractions shown in FIG. 7 would require at least hydrotreating prior to use as a marine gas oil. Thus, the carbon intensity for a marine gas oil formed from one of these comparative fractions would be higher. The energy content of the comparative fractions is also lower, at 42.8 MJ/kg or less. Additionally, the comparative fractions have cetane index values below 50. The comparative fractions also have substantially higher densities and kinematic viscosities.

FIG. 8 shows modeled compositional features and properties for alternative distillate fractions formed from five of the seven shale crude oils. The alternative distillate fractions have an initial boiling point of 148° C. and a final boiling point of 464° C., so that a slightly greater portion of vacuum gas oil boiling range compounds is included in the fractions. This results in a modeled T10 distillation point of 185° C. to 195° C. and a T90 distillation point of 380° C. to 405° C. As shown in the modeled compositional values and properties in FIG. 8, the distillate fractions have an unexpectedly high weight ratio and/or volume ratio of naphthenes (cycloparaffins) to aromatics of 2.5 or more, or 3.0 or more, such as up to 8.0 or possibly still higher, while also including 5.0 wt % to 18 wt % aromatics, or 5.0 wt % to 15 wt %, or 5.0 wt % to 12 wt % (or 5.0 vol % to 18 vol % aromatics, or 5.0 vol % to 15 vol %, or 5.0 vol % to 12 vol %). The distillate fractions further have an unexpected combination of a low density at 15° C. of 810 kg/m³ to 840 kg/m³ (or 810 kg/m³ to 830 kg/m³); an energy content of 42.9 MJ/kg or greater; a low kinematic viscosity at 40° C. of 2.8 cSt to 3.2 cSt; a low sulfur content of 0.04 wt % to 0.10 wt %, or 0.05 wt % to 0.09 wt %; a low nitrogen content of 200 wppm or less, or 100 wppm or less, or 50 wppm or less, such as down to 5.0 wppm; and an acid number of less than 0.1 mg KOH/kg, or less than 0.08 mg KOH/kg.

FIG. 9 shows comparative data corresponding to modeled distillate boiling range fractions with comparable boiling ranges relative to FIG. 8 from three representative conventional crudes. Comparative distillate fraction A corresponds to a fraction derived from a light sweet crude. Comparative distillate fractions B and C correspond to fractions derived from heavy sour crudes. FIG. 9 further shows some specifications for forming a DMA marine gas oil according to ISO 8217.

As shown in FIG. 9, the comparative distillate fractions have weight ratios/volume ratios of naphthenes to aromatics that are less than 2.5, as well as sulfur contents of 0.3 wt % or more. Based on the sulfur content, any of the comparative fractions shown in FIG. 9 would require at least hydrotreating prior to use as a marine gas oil. Thus, the carbon intensity for a marine gas oil formed from one of these comparative fractions would be higher. Additionally, the comparative fractions have cetane index values below 50. The comparative fractions also have higher densities and kinematic viscosities.

Characterization of Shale Oil Fractions—Vacuum Gas Oils and Corresponding Fuel Oils In some aspects, a vacuum gas oil fraction of a shale oil as described herein or a fraction can be used as a marine fuel oil or as a blending component for a marine fuel oil. The combination of low sulfur, high naphthene to aromatics ratio, low density, and low kinematic viscosity can allow a vacuum gas oil to be used as a marine fuel oil with reduced or minimized processing, such as possibly using the fraction as a fuel oil after distillation without further processing.

FIG. 10 and FIG. 11 show measured compositional features and properties for vacuum gas oil fractions formed from seven shale crude oils and/or shale crude oil blends. The vacuum gas oil cuts shown in FIG. 10 and FIG. 11 had a T10 distillation point of roughly 365° C.-380° C. and a T90 distillation point of roughly 500° C. to 525° C. As shown in FIG. 10 and FIG. 11, these vacuum gas oil fractions derived from shale crude oils and/or blends of shale crude oils had a relatively low density at 15° C. of 850 kg/m³ to 890 kg/m³, which indicates the presence of an unexpectedly high ratio of naphthenes to aromatics in the vacuum gas oil fractions. The unexpectedly high ratio of napthenes to aromatics is further indicated by the high saturates content of the fractions of 75 wt % or more. The vacuum gas oil fractions also had other unexpected combinations of properties, including an unexpectedly low kinematic viscosity; a sulfur content of less than 0.1 wt %, or less than 0.05 wt %, or less than 0.025 wt %; and a nitrogen content of less than 500 wppm, or less than 350 wppm.

FIG. 12 shows modeled data for the five vacuum gas oils shown in FIG. 10. The modeled vacuum gas oil fractions shown in FIG. 12 have an initial boiling point of 371° C. and a final boiling point of 538° C. This results in a modeled T10 distillation point of 385° C. to 395° C. and a T90 distillation point of 480° C. to 490° C. As shown in the modeled compositional values and properties in FIG. 12, the vacuum gas oil fractions have an unexpectedly high weight ratio/volume ratio of naphthenes (cycloparaffins) to aromatics of 1.0 or more, or 1.5 or more, or 2.0 or more, such as up to 6.0 or possibly still higher, while also including 8.0 wt % to 33 wt % aromatics, or 8.0 wt % to 22 wt %, or 10 wt % to 33 wt %, or 10 wt % to 22 wt % (or 8.0 vol % to 33 vol %, or 8.0 vol % to 22 vol %, or 10 vol % to 33 vol %, or 10 vol % to 22 vol %). Four of the five vacuum gas oil fractions have a naphthenes content of 40 wt %/40 vol % or more. The vacuum gas oil fractions further have an unexpected combination of a low density at 15° C. of 860 kg/m³ to 892 kg/m³ (or 860 kg/m³ to 882 kg/m³); an energy content of 42.4 MJ/kg or greater; a low kinematic viscosity at 50° C. of 20 cSt to 30 cSt; a low sulfur content of 0.03 wt % to 0.20 wt %; a low nitrogen content of 1000 wppm or less, or 850 wppm or less, or 350 wppm or less, such as down to 30 wppm; a CCAI value of 760 to 785; a molar ratio of hydrogen to carbon of greater than 1.8; and an acid number of less than 0.15 mg KOH/kg, or less than 0.12 mg KOH/kg. Based on the sulfur content, density, and kinematic viscosity, the vacuum gas oil boiling range fractions in FIG. 12 can be used as a fuel oil with a reduced or minimized amount of additional processing. For example, the vacuum gas oil boiling range fractions in FIG. 12 can be used as a RMD 80 very low sulfur fuel oil according to ISO 8217 after distillation to form the distillate boiling range fraction.

FIG. 13 shows comparative data corresponding to modeled comparable vacuum gas oil boiling range fractions from three representative conventional crudes. Comparative vacuum gas oil fraction A corresponds to a fraction derived from a light sweet crude. Comparative vacuum gas oil fractions B and C correspond to fractions derived from heavy sour crudes. FIG. 13 also shows values for a hydrotreated vacuum gas oil fraction, as described in U.S. Pat. No. 8,999,011. FIG. 13 further shows some specifications for forming a RMD80 very low sulfur fuel oil according to ISO 8217.

As shown in FIG. 13, the comparative vacuum gas oil fractions have weight ratios/volume ratios of naphthenes to aromatics that are less than 1.5, or less than 1.0, as well as sulfur contents of 0.6 wt % or more. Based on the sulfur content, any of the comparative vacuum gas oil fractions shown in FIG. 13 would require at least hydrotreating prior to use as a very low sulfur fuel oil. Thus, the carbon intensity for a fuel oil formed from one of these comparative fractions would be higher. The energy content of the comparative fractions is also lower, at 42.2 MJ/kg or less. Additionally, the comparative fractions have a molar ratio of hydrogen to carbon of less than 1.8. The comparative fractions also have higher densities and kinematic viscosities.

Fuel Oil Blends Including Shale Vacuum Gas Oils

In the examples below, a variety of refinery fractions, renewable fractions and finished fuels are used as representative blending components for the formation of fuel blends. The fuel blends are formed by blending one or more low sulfur, high naphthene to aromatic ratio shale oil fractions with one or more of the refinery fractions, renewable fractions, or finished fuels.

As described above, vacuum gas oil fractions derived from low sulfur, high naphthene to aromatic shale oils can be used as fuel oils after reduced or minimized amounts of processing. This can have a corresponding effect of reducing or minimizing the carbon intensity of the resulting fuel due to refinery processing. In addition to using the low carbon intensity vacuum gas oils as fuel oils, the vacuum gas oils can also be blended with other low carbon intensity fractions to form still lower carbon intensity fuels.

As an example, distillates derived from biological sources can have a substantially lower carbon intensity, due in part to the consumption of carbon during the formation of the biomass. Blending a shale oil vacuum gas oil fraction with biodiesel and/or another renewable distillate can also provide unexpected synergistic advantages. For example, shale oil vacuum gas oils can also tend to have a relatively high pour point, so the biodiesel can also act as a pour point corrector. Biodiesel can also tend to have high solvency for asphaltenes, so blending biodiesel with a shale oil atmospheric resid can improve the ability to combine the resulting blended product with other resid fractions.

Another potential blending route for low carbon intensity vacuum gas oils can be to blend a vacuum gas oil with a conventional resid fraction to form low sulfur or very low sulfur fuel oils. The low density of these low carbon intensity vacuum gas oils means that they could be used to correct density in a blend, thereby expanding the use of high density component such as LCO, HCO, FCC bottoms, and visbreaker tars for making marine fuel oils. These low carbon intensity vacuum gas oils could also be used to correct sulfur, viscosity and CCAI in a blend, making it a versatile blend component. Additionally, the low carbon intensity vacuum gas oils have a viscosity at 50° C. about 10 times higher than a middle distillate. Thus, a low carbon intensity vacuum gas oil could be blended at a high level into a fuel oil and yet maintain a viscosity at 50° C.>10 cSt, which is the minimum viscosity preferred for optimal operation of the fuel injection system in a marine engine.

The first two columns of Table 5 show two types of biodiesels that were used as blend components for forming fuel oils and marine gas oils. The final two columns show two types of hydrotreated vegetable oils that were used as blend components for forming fuel oils.

TABLE 5

| Vacuum Gas Oil Blend Components (Model) | | | | |
| --- | --- | --- | --- | --- |
| | Biodiesel 1 | Biodiesel 2 | HVO1 | HVO2 |
| Density at 15° C. (kg/m3) | 881.1 | 879.6 | 795.5 | 777.7 |
| KV50 (cSt) | 3.5 | 3.734 | 3.076 | 2.299 |
| Sulfur (ppm m/m) | ~5 | ~5 | ~5 | ~5 |

TABLE 5-continued

| Vacuum Gas Oil Blend Components (Model) | | | | |
| --- | --- | --- | --- | --- |
| | Biodiesel 1 | Biodiesel 2 | HVO1 | HVO2 |
| CCAI | 828 | 824 | 746 | 741 |
| BMCI | 55 | 80 | 4 | −2 |
| TE | 0 | 0 | 0 | 0 |
| MCR (wt %) | 0 | 0 | 0 | 0.4 |
| Cloud Point | −1 | >1 | 10 | −10 |
| Pour Point (° C.) | <−5 | 6 | 10 | −10 |

Table 6 shows modeling results for blending vacuum gas oils from FIG. 12 with varying amounts of biodiesel or hydrotreated vegetable oil.

TABLE 6

| Low Carbon Intensity Fuel Oil Blends Based on Vacuum Gas Oil | | | | | |
| --- | --- | --- | --- | --- | --- |
| | ISO8217 RMD80 Spec | 90% HD5 + 10% Biodiesel 1 | 55% HD3 + 45% Biodiesel 2 | 90% HD5 + 10% HVO 2 | 55% HD3 + 45% HVO 1 |
| Density at 15° C. (kg/m3) | <990 | 878.7 | 885.4 | 868.3 | 0.8523 |
| Viscosity at 50° C. (cSt) | <80 | 19.8 | 9.9 | 18.2 | 8.7 |
| Sulfur (wt %) | <0.50 | 342 | 926 | 346 | 967 |
| CCAI | <860 | 781 | 803 | 772 | 768 |
| BMCI | — | 32 | 55 | 27 | 21 |
| TE | — | 0 | 0 | 0 | 0 |
| N-Heptane Insolubles (wt %) | — | 0.00 | 0.00 | 0.00 | 0.00 |
| MCR (wt %) | <14 | 0.07 | 0.10 | 0.07 | 0.11 |
| Pour Point (° C.) | <30 | ~30 | ~23 | ~30 | ~25 |

As shown in Table 6, low carbon intensity fuel oils that satisfy the specifications for an RMD80 fuel oil can be formed with blends ranging from 10 vol % to 45 vol % in biodiesel, with the balance (55 vol % to 90 vol %) corresponding to low carbon intensity vacuum gas oil. Because of the low, sulfur content, and density of the low carbon intensity vacuum gas oil fractions, addition of 10 vol % of biodiesel or hydrotreated vegetable oil can result in a blend with satisfactory properties. Higher contents of biodiesel or hydrotreated vegetable oil, such as up to 45 vol %, can also be used due to the higher kinematic viscosity of the vacuum gas oil relative to a middle distillate fraction. Additionally, inclusion of 10 vol % or more of biodiesel or hydrotreated vegetable oil can be sufficient to form a blended fuel oil product with a pour point of 30 or less.

Characterization of Shale Oil Fractions—Vacuum Resids and Corresponding Fuel Oil Blends Vacuum resid fractions correspond to fractions with T10 distillation points of roughly 500° C. or more. The kinematic viscosity of vacuum resid fractions derived from shale crude oil is typically too high to be used directly as a fuel oil. However, the other properties of a shale oil vacuum resids can allow the vacuum resids to serve as beneficial blending components.

For example, based on the low sulfur content, high energy content and low CCAI, shale oil vacuum resids can be beneficial fuel oil blend components to produce 0.1 wt % sulfur (ECA fuel oils) and 0.5 wt % sulfur fuel oils (VLSFO). The low density of the vacuum resids means that they can be used to correct density in a blend, thereby expanding the use of high density component such as LCO, HCO, FCC bottoms and visbreaker tars for making marine fuel oils.

FIG. 14 shows modeling of vacuum resid fractions for the five types of shale crude oils or shale crude oil blends shown in FIG. 3. The modeled vacuum resid fractions in FIG. 14 have an initial boiling point of 538° C. and a final boiling point greater than 600° C. As shown in FIG. 14, the vacuum resid fractions have a low density of 880 kg/m³ to 950 kg/m³, or 880 kg/m³ to 920 kg/m³. The vacuum resid fractions also have a low sulfur content of 0.35 wt % or less, or 0.1 wt % or less. The CCAI of the vacuum resids is also low, with values between 720 and 780, or between 720 and 750. Additionally, four of the five vacuum resids have an unexpectedly high weight ratio/volume ratio of naphthenes to aromatics of 1.0 or more, or 1.5 or more. For the four vacuum resids, this is due to having a naphthenes content of greater than 38 wt %/38 vol %, or greater than 40 wt %/40 vol %, and an unexpectedly low aromatics content of 20 wt % to 42 wt % (or 20 vol % to 42 vol %).

Modeled examples of blending these fuel oil components with light cycle oil (LCO), gas oil and biodiesel to make finished ECA fuel oil and very low sulfur fuel oil (VLSFO) are given in Tables 7 and 8. In the LCO examples in Table 7, the density, CCAI and sulfur are simultaneously reduced in the blends containing VR Fuel Oil 1 or 3 from FIG. 14, which meets the VLSFO spec. In the gas oil examples, an ECA fuel oil product is made from VR Fuel Oils 2 and 5 because gas oil corrects the high pour point and viscosity of the fuel oil components while maintaining a sulfur content below 0.1 wt %.

TABLE 7

Vacuum Resid Blends

|  | ISO8217 RMD80 Spec | 55% LCO, 45% VRFO1, VLSFO, high ratio | 35% LCO, 60% VRFO3, VLSFO, low ratio | 35% Gas Oil, 65% VRFO2, ECA, low ratio | 75% Gas Oil, 25% VRFO5, ECA, high ratio |
|---|---|---|---|---|---|
| Density at 15° C. (kg/m3) | <990 | 901.8 | 936.9 | 8771 | 870.3 |
| KV50 (cSt) | <80 | 28 | 202 | 112 | 11.6 |
| Sulfur (wt %) | <0.50 | 0.4808 | 0.4950 | 0.0403 | 0.0593 |
| CCAI | <860 | 798 | 805 | 752 | 784 |
| BMCI | — | 42 | 54 | 25 | 31 |
| TE | — | 6 | 4 | 0 | 0 |
| N-Heptane Insolubles (wt %) | — | 0.15 | 0.16 | 0.15 | 0.02 |
| MCR (wt %) | <14 | 0.18 | 4.58 | 0.34 | 0.74 |
| Pour Point (° C.) | <30 | 21 | 24 | 29 | 14 |

The biodiesel blends in Table 8 demonstrate that a wide range of biodiesel blend ratios is possible while having viscosity, pour point and sulfur content meets the requirements of an ECA or VLSFO product.

TABLE 8

Vacuum Resid Blends with Renewable Distillates

|  | ISO8217 RMD80 Spec | 25% Biodiesel, 75% VRFO5, ECA, low ratio | 50% Biodiesel, 50% VRFO1, ECA, high ratio | 30% Biodiesel, 70% VRFO3, VLSFO, low ratio | 70% Biodiesel, 30% VRFO3, VLSFO, low ratio |
|---|---|---|---|---|---|
| Density at 15° C. (kg/m3) | <990 | 907.0 | 880.9 | 926.9 | 0.8999 |
| KV50 (cSt) | <80 | 366 | 33.0 | 298 | 13.8 |
| Sulfur (wt %) | <0.50 | 0.0592 | 0.0148 | 0.2269 | 0.1004 |
| CCAI | <860 | 768 | 774 | 790 | 810 |
| BMCI | — | 46 | 50 | 59 | 71 |
| TE | — | 0 | 0 | 0 | 0 |
| N-Heptane Insolubles (wt %) | — | 0.05 | 0.11 | 0.14 | 0.06 |
| MCR (wt %) | <14 | 2.14 | 0.11 | 4.93 | 2.18 |
| Pour Point (° C.) | <30 | 29 | 27 | 28 | 15 |

Properties for the LCO, gas oil, and biodiesel used in Tables 7 and 8are provided in Table 9.

TABLE 9

Blend Components for Vacuum Resid Blends

|  | LCO | Gas Oil | Biodiesel 2 |
|---|---|---|---|
| Density at 15° C. (kg/m3) | 918.0 | 855.0 | 879.6 |
| KV50 (cSt) | 4.2 | 4.27 | 3.734 |
| Sulfur (ppm m/m) | 8260 | 526 | ~5 |
| CCAI | 858 | 795 | 824 |
| BMCI | 61.3 | 30 | 80 |
| TE | 17.5 | 0 | 0 |
| MCR (wt %) | 0.2 | <0.001 | 0 |
| Cloud Point | — | ? | >1 |
| Pour Point (° C.) | −6 | 6 | 6 |

ADDITIONAL COMPARATIVE EXAMPLES

The resid-containing, distillate, and vacuum gas oil compositions and blends described herein can be formed from selected types of crude oils, such as selected types of shale crude oils. Table 10 shows some comparative fractions that roughly correspond to vacuum gas oil boiling range fractions. The fractions shown in Table 10 were described in an article titled "Catalytic Solutions for Processing Shale Oils in the FCC" (www.digitalrefining.com, April 2014).

TABLE 10

Comparative VGO Fractions

|  | Eagle Ford Condensate Splitter Bottoms | VGO derived from 85% Eagle Ford | Bakken Crude 650° F. + bottoms | Mid-Continent VGO |
|---|---|---|---|---|
| API Gravity | 36.6 | 30 | 23 | 24.7 |
| Sulfur (wt %) | 0.08 | 0.83 | 0.43 | 0.35 |
| Aromatic ring carbons | 14.8 | 15.2 | 22.1 | 17.6 |
| Naphthene ring carbons | 19.4 | 9.8 | 17.3 | 20.3 |

TABLE 10-continued

Comparative VGO Fractions

| | Eagle Ford Condensate Splitter Bottoms | VGO derived from 85% Eagle Ford | Bakken Crude 650° F. + bottoms | Mid-Continent VGO |
|---|---|---|---|---|
| Paraffinic carbons | 65.8 | 75 | 60.6 | 62.1 |
| D2887 (° F.) | | | | |
| T10 | 519 | 715 | 658 | 691 |
| T50 | 735 | 862 | 844 | 848 |
| T90 | 1006 | 1015 | 1135 | 1045 |

The Eagle Ford and Bakken fractions shown in Table 10 correspond to shale fractions, while the Mid-Continent VGO corresponds to a conventional fraction. The fractions in Table 10 roughly correspond to vacuum gas oil fractions, although the first column (splitter bottoms) includes some distillate. In Table 10, the aromatic carbons and naphthene carbons are reported based on the percentage of carbons that are present in ring structures, rather than providing a total weight percent for naphthenes or aromatics. However, this should not have a significant impact on the ratio of napthenes to aromatics.

As shown in Table 10, all of the comparative vacuum gas oil fractions have naphthenic carbon to aromatic carbon ratios of less than 1.5. This is in contrast to the vacuum gas oil fractions shown in FIG. 12, where four of the five fractions have naphthenes to aromatics weight ratios of greater than 2.0. This further illustrates the unexpected nature of the atmospheric resid, vacuum resid, and vacuum gas oil compositions described herein.

ADDITIONAL EMBODIMENTS

Embodiment 1. A resid-containing fraction comprising a T90 distillation point of 550° C. or more, a kinematic viscosity at 50° C. of 40 cSt to 150 cSt, a sulfur content of 0.2 wt % or less, a BMCI of 40 or less, and a weight ratio of aliphatic sulfur to total sulfur of 0.2 or more.

Embodiment 2. The resid-containing fraction of Embodiment 1, wherein the resid-containing fraction comprises a weight ratio of naphthenes to aromatics of 1.5 or more, or wherein the resid-containing fraction comprises a flash point of 120° C. or more, or a combination thereof.

Embodiment 3. A fuel composition comprising 5 vol % to 60 vol % of a distillate fraction and 40 vol % to 95 vol % of the resid-containing fraction of Embodiment 1 or 2.

Embodiment 4. The fuel composition of Embodiment 3, wherein the distillate fraction comprises a renewable distillate fraction, the renewable distillate fraction comprising one or more of biodiesel, fatty acid alkyl ester, and hydrotreated vegetable oil; or wherein the renewable distillate comprises a distillate made, processed or a combination thereof using a renewable energy source; or wherein the renewable distillate comprises a distillate formed from processing of biologically derived waste, or a combination thereof.

Embodiment 5. A fuel composition comprising: a) 50 vol % to 99 vol % of a distillate fraction and 1.0 vol % to 50 vol % of a resid-containing fraction, a micro carbon residue content of 0.30 wt % or less, a kinematic viscosity at 40° C. of 11 cSt or less, and a sulfur content of 0.5 wt % or less; or b) 45 vol % to 99 vol % of the distillate fraction and 1.0 vol % to 55 vol % of the resid-containing fraction, a micro carbon residue content of 2.5 wt % or less, a kinematic viscosity at 50° C. of 10 cSt or less, and a sulfur content of 0.5 wt % or less, wherein the resid-containing fraction comprises a T90 distillation point of 550° C. or more, a kinematic viscosity at 50° C. of 40 cSt to 150 cSt, a sulfur content of 0.2 wt % or less, a BMCI of 40 or less, and a weight ratio of aliphatic sulfur to total sulfur of 0.2 or more.

Embodiment 6. A resid-containing fraction comprising a T10 distillation point of 150° C. to 200° C., a T90 distillation point of 550° C. or more, a kinematic viscosity at 50° C. of 3.0 cSt to 7.0 cSt, a sulfur content of 0.2 wt % or less, a density at 15° C. of 860 kg/m$^3$ or less, a BMCI of 35 or less, a weight ratio of naphthenes to aromatics of 1.5 or more, and a weight ratio of aliphatic sulfur to total sulfur of 0.2 or more.

Embodiment 7. The resid-containing fraction or fuel composition of any of the above Embodiments, wherein the resid-containing fraction comprises a weight ratio of basic nitrogen to total nitrogen of 0.2 or more; or wherein the resid-containing fraction comprises 5.0 wppm or more of sodium; or wherein the resid-containing fraction comprises 10 wppm or more of calcium; or a combination of two or more thereof.

Embodiment 8. The resid-containing fraction or fuel composition of any of the above Embodiments, wherein the resid-containing fraction comprises a) an n-heptane insolubles content of 0.1 wt % or less, b) a density at 15° C. of 920 kg/m$^3$ or less, c) a naphthenes content of 30 wt % or more, d) a micro carbon residue content of 2.5 wt % or less, e) a combination of two or more of a)-d), or f) a combination of three or more of a)-d).

Embodiment 9. The resid-containing fraction or fuel composition of any of the above Embodiments, wherein the resid-containing fraction comprises a molar ratio of hydrogen to carbon of 1.80 or more, or wherein the resid-containing fraction comprises an energy content of 42.0 MJ/kg or more.

Embodiment 10. The resid-containing fraction or fuel composition of any of the above Embodiments, wherein the resid-containing fraction comprises a kinematic viscosity at 50° C. of 40 cSt to 120 cSt, or wherein the resid-containing fraction comprises a sulfur content of 0.1 wt % or less, or a combination thereof.

Embodiment 11. The resid-containing fraction or fuel composition of any of the above Embodiments, wherein the resid-containing fraction comprises a T95 distillation point of 550° C. or more, or wherein the resid-containing fraction comprises a final boiling point of 600° C. or more, or wherein the resid-containing fraction comprises a T10 distillation point of 350° C. or more, or a combination thereof.

Embodiment 12. The resid-containing fraction or fuel composition of any of the above Embodiments, wherein the resid-containing fraction comprises a resid-containing fraction derived from a shale oil.

Embodiment 13. Use of a composition comprising a resid-containing fraction or a fuel composition according to any of the above Embodiments as a fuel in an engine, a furnace, a burner, a combustion device, or a combination thereof.

Embodiment 14. Use of the composition of Embodiment 13, wherein the resid-containing fraction comprises a fraction that has not been exposed to hydroprocessing conditions.

Embodiment 15. A method for forming a resid-containing fraction, comprising: fractionating a whole crude or crude fraction to form a resid-containing fraction according to any of Embodiments 1, 2, or 5-10.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A resid-containing fraction comprising a T90 distillation point of 550° C. or more, a kinematic viscosity at 50° C. of 40 cSt to 180 cSt, a sulfur content of 0.2 wt % or less, a BMCI of 40 or less and a flash of 120° C. or more.

2. The resid-containing fraction of claim 1, wherein the resid-containing fraction comprises a weight ratio of naphthenes to aromatics of 1.5 or more.

3. The resid-containing fraction of claim 1, wherein the resid-containing fraction comprises a weight ratio of basic nitrogen to total nitrogen of 0.2 or more; or wherein the resid-containing fraction comprises 5.0 wppm or more of sodium; or wherein the resid-containing fraction comprises 10 wppm or more of calcium; or a combination of two or more thereof.

4. The resid-containing fraction of claim 1, wherein the resid-containing fraction comprises a) an n-heptane insolubles content of 0.1 wt % or less, b) a density at 15° C. of 920 kg/m$^3$ or less, c) a naphthenes content of 30 wt % or more, d) a micro carbon residue content of 2.5 wt % or less, e) a combination of two or more of a)-d), or f) a combination of three or more of a)-d).

5. The resid-containing fraction of claim 1, wherein the resid-containing fraction comprises a molar ratio of hydrogen to carbon of 1.80 or more, or wherein the resid-containing fraction comprises an energy content of 42.0 MJ/kg or more.

6. The resid-containing fraction of claim 1, wherein the resid-containing fraction comprises a kinematic viscosity at 50° C. of 40 cSt to 120 cSt, or wherein the resid-containing fraction comprises a sulfur content of 0.1 wt % or less, or a combination thereof.

7. The resid-containing fraction of claim 1, wherein the resid-containing fraction comprises a T95 distillation point of 550° C. or more, or wherein the resid-containing fraction comprises a final boiling point of 600° C. or more, or wherein the resid-containing fraction comprises a T10 distillation point of 350° C. or more, or a combination thereof.

8. The resid-containing fraction of claim 1, wherein the resid-containing fraction comprises a resid-containing fraction derived from a shale oil.

9. The resid-containing fraction of claim 1, wherein the resid-containing fraction is used as a fuel in an engine, a furnace, a burner, a combustion device, or a combination thereof.

10. The resid-containing fraction of claim 1, wherein the resid-containing fraction has not been exposed to hydroprocessing conditions.

11. The resid-containing fraction of claim 1, wherein the resid-containing fraction comprises a) an n-heptane insolubles content of 0.1 wt % or less, b) a density at 15° C. of 920 kg/m$^3$ or less, c) a naphthenes content of 30 wt % or more, d) a T90 distillation point of 550° C. or more, e) a combination of two or more of a)-d) or f) a combination of three or more of a)-d).

12. A fuel composition comprising 5 vol % to 60 vol % of a distillate fraction and 40 vol % to 95 vol % of a resid-containing fraction, the resid-containing fraction comprising a T90 distillation point of 550° C. or more, a kinematic viscosity at 50° C. of 40 cSt to 180 cSt, a sulfur content of 0.2 wt % or less, and a BMCI of 40 or less.

13. The fuel composition of claim 12, wherein the distillate fraction comprises a renewable distillate fraction.

14. The fuel composition of claim 13, wherein the renewable distillate fraction comprises one or more of biodiesel, fatty acid alkyl ester, and hydrotreated vegetable oil; or wherein the renewable distillate comprises a distillate made, processed or a combination thereof using a renewable energy source; or wherein the renewable distillate comprises a distillate formed from processing of biologically derived waste, or a combination thereof.

15. The fuel composition of claim 12, wherein the fuel composition comprises a pour point of 30° C. or less.

16. A method for forming a resid-containing fraction, comprising:
fractionating a whole crude or crude fraction to form a resid-containing fraction comprising, a T90 distillation point of 550° C. or more, a kinematic viscosity at 50° C. of 40 cSt to 180 cSt, a sulfur content of 0.2 wt % or less, and a BMCI of 40 or less.

17. The method of claim 16, wherein the resid-containing fraction is formed without exposing the resid-containing fraction to hydroprocessing conditions.

18. The method of claim 16, wherein the resid-containing fraction comprises a weight ratio of naphthenes to aromatics of 1.5 or more.

19. The method of claim 16, wherein the resid-containing fraction comprises a weight ratio of basic nitrogen to total nitrogen of 0.2 or more; or wherein the resid-containing fraction comprises 5.0 wppm or more of sodium; or wherein the resid-containing fraction comprises 10 wppm or more of calcium; or a combination of two or more thereof.

20. The method of claim 16, wherein the resid-containing fraction comprises a flash point of 120° C. or more.

21. A resid-containing fraction comprising a micro carbon residue content of 2.5 wt % or less, a kinematic viscosity at 50° C. of 40 cSt to 180 cSt, a sulfur content of 0.2 wt % or less, a BMCI of 40 or less, and a flash point of 120° C. or more.

22. The resid-containing fraction of claim 21, wherein the resid containing fraction comprises a weight ratio of naphthenes to aromatics of 1.5 or more.

23. The resid-containing fraction of claim 21, wherein the resid-containing fraction comprises a weight ratio of basic nitrogen to total nitrogen of 0.2 or more; or wherein the resid-containing fraction comprises 5.0 wppm or more of sodium; or wherein the resid-containing fraction comprises 10 wppm or more of calcium; or a combination of two or more thereof.

24. The resid-containing fraction of claim 21, wherein the resid-containing fraction comprises a molar ratio of hydrogen to carbon of 1.80 or more, or wherein the resid-containing fraction comprises an energy content of 42.0 MJ/kg or more.

25. The resid-containing fraction of claim 21, wherein the resid-containing fraction comprises a kinematic viscosity at 50° C. of 40 cSt to 120 cSt, or wherein the resid-containing fraction comprises a sulfur content of 0.1 wt % or less, or a combination thereof.

26. The resid-containing fraction of claim 21, wherein the resid-containing fraction comprises a T95 distillation point of 550° C. or more, or wherein the resid-containing fraction comprises a final boiling point of 600° C. or more, or wherein the resid-containing fraction comprises a T10 distillation point of 350° C. or more, or a combination thereof.

27. The resin-containing fraction of claim 21, wherein the resid-containing fraction comprises a resid-containing fraction derived from a shale oil.

\* \* \* \* \*